US008515870B2

(12) United States Patent
Oskolkov et al.

(10) Patent No.: US 8,515,870 B2
(45) Date of Patent: Aug. 20, 2013

(54) ELECTRONIC PAYMENT SYSTEMS AND SUPPORTING METHODS AND DEVICES

(75) Inventors: Ilya Oskolkov, Moscow (RU); Rodion Shishkov, St. Petersburg (RU)

(73) Assignee: Rawllin International Inc., Tortola (VG)

( * ) Notice: Subject to any disclaimer, the term of this patent is extended or adjusted under 35 U.S.C. 154(b) by 0 days.

(21) Appl. No.: 13/225,724

(22) Filed: Sep. 6, 2011

(65) Prior Publication Data

US 2013/0060690 A1   Mar. 7, 2013

(51) Int. Cl.
*G06Q 40/00* (2012.01)
(52) U.S. Cl.
USPC ............................................. 705/43; 705/35
(58) Field of Classification Search
USPC ........................................................ 705/35–43
See application file for complete search history.

(56) References Cited

U.S. PATENT DOCUMENTS

| | | |
|---|---|---|
| 7,089,208 B1 | 8/2006 | Levchin et al. |
| 7,120,608 B1 | 10/2006 | Gallagher |
| 7,873,573 B2 | 1/2011 | Realini |
| 2009/0024529 A1 | 1/2009 | Baig |
| 2009/0132423 A1 | 5/2009 | Liu |
| 2009/0319425 A1 | 12/2009 | Tumminaro |
| 2010/0205095 A1* | 8/2010 | Ostrovsky ................... 705/44 |
| 2010/0299256 A1 | 11/2010 | Gallagher |
| 2011/0010293 A1 | 1/2011 | Giordano |

FOREIGN PATENT DOCUMENTS

| | | |
|---|---|---|
| WO | 2008033551 A2 | 3/2008 |
| WO | 2009114876 A2 | 9/2009 |

OTHER PUBLICATIONS

Parkes. Sending Money with Skype. Published online Jun. 16, 2011. http://blogs.skype.com/en/2009/02/sending_money_with_skype.html , 3 pages.
Henderson. Skype to offer money-transfer system via PayPal. Published online Jun. 16, 2011. http://thebankwatch.com/2007/03/21/skype-to-offer-money-transfer-system-via-paypal/ , 4 pages.
OA dated Oct. 30, 2012 for U.S. Appl. No. 13/225,860, 11 pages.
OA dated Jan. 25, 2013 for U.S. Appl. No. 13/225,860, 11 pages.
Advisory Action dated Mar. 14, 2013 for U.S. Appl. No. 13/225,860, 3 pages.

* cited by examiner

*Primary Examiner* — Thu Thao Havan
(74) *Attorney, Agent, or Firm* — Turocy & Watson, LLP

(57) ABSTRACT

Electronic payment systems and supporting methods and devices are described. For instance, the disclosed subject matter describes aggregated transactional account functionality configured to receive electronic financial transactions associated with one or more of a set of electronic identifying information such as phone ID, email, instant message, etc. for a user and related functionality. The disclosed details enable various refinements and modifications according to system design and tradeoff considerations.

36 Claims, 16 Drawing Sheets

ELECTRONIC PAYMENT SYSTEMS AND SUPPORTING METHODS AND DEVICES

CROSS-REFERENCE TO RELATED APPLICATIONS

This application is related to U.S. patent application Ser. No. 13/225,860, entitled ELECTRONIC PAYMENT SYSTEMS AND SUPPORTING METHODS AND DEVICES, and filed on Sep. 6, 2011, the entirety of which is incorporated herein by reference.

FIELD OF THE INVENTION

The disclosed subject matter relates generally to communications and, more particularly, to communications associated with financial payments, electronic payment systems, and supporting methods and devices.

BACKGROUND OF THE INVENTION

Banking as an institution, to date, remains a highly formal, inflexible, inefficient, and impersonal interaction between people and their money. Unless one chooses a seemingly infeasible option of operating and interacting in the world on a strictly cash basis, which would require carrying around risky sums of cash, to date, people have been at the mercy of banking institutions when interaction with each other involving money.

As an example of the extreme formality, banking laws and practices have built up around negotiable instruments for such interaction and resulting transactions. For instance, cashier's checks, certified funds, wire transfers, Automated Clearing House (ACH) transfers, credit cards, debit cards, and their associated legal institutions serve to protect parties (including banking institutions) from unscrupulous actions by the parties.

However, as the inexorable march of technology progresses, banking institutions as a whole have been slow to adapt, owing largely to risk aversion when it comes to suffering financial losses, which tends forward inflexibility regarding deploying technological advancements. For instance, while the automatic teller machine (ATM) has been in development since before the 1960's and has largely replaced customer-teller transactions, only recently have ATMs been widely employ optical character recognition (OCR) technology to accept negotiable instruments as deposits, which eliminated the tedious deposit slip and envelope and subsequent manual or semi-automated processing. As a further example, inter-account transfers are practically limited to occurring between large institutions (e.g., wire transfers and/or ACH transfers between a bank and another institution such as a creditor, or another depository institution).

As such, this leads to inefficiencies when a sender/payor/transferor/debtor desires interacting financially with another person. As an example, assume a sender/payor/transferor/debtor desires making a payment to a recipient/payee/transferee/creditor. The sender/payor/transferor/debtor must retrieve funds (cash, certified funds, obtain ability to draft negotiable instruments on an account with the institution, etc.) from an institution, arrange a meeting with the transferee (for untrusted transactions), escrow arrangement (with concomitant fees), or other arrangement to send payment of cash or check, then the recipient/payee/transferee/creditor must then make arrangements to deposit funds into an account (e.g., if by payment is negotiable instrument). Moreover, behind the scenes, there is an impersonal web of intractable agreements that governs how many days the funds can be held before becoming available, fee agreements that govern what fees are to be paid for accessing the funds, and so on, etc.

In sum, the ability for people to interact financially with each other remains tied to the formal, inflexible, inefficient, and impersonal conservative institutions that have developed over 500 years of banking history. For trusted transactions, e.g., between parties who know or trust each other, either by personal history, proximity, or otherwise, many of these hurdles can be eliminated to approximate a face to face cash transaction. Thus, there can be improvements made to these institutions such that the interactions more closely approximate a face to face cash transaction between trusted friends.

In addition, whereas with the increasingly wired and wireless world, virtual interactions take place between people (arguably just as much as, if not more than, real world interactions. For example, countless times a day people email, Short Message Service (SMS) or text message, Multimedia Messaging Service (MMS), Skype®, instant messaging (IM) (e.g., ICQ™, AOL® IM or AIM®, etc.), interact through Facebook™, Twitter™, Internet Relay Chat (IRC), and countless other communication platforms that bring people closer together. Moreover, people are making ever-increasing use of mobile devices as compared to fixed devices for their interactions.

Accordingly, whereas conventional implementations of banking practices involving technological improvements seems to merely layer these methods of interactivity onto existing infrastructure and policies, the practices remain formal, inflexible, and inefficient, while becoming even more impersonal, such as by increasingly cutting out the human interaction.

The above-described deficiencies are merely intended to provide an overview of some of the problems encountered in financial transactions between individuals, electronic payment systems, and supporting methods and devices and are not intended to be exhaustive. Other problems with conventional systems and corresponding benefits of the various non-limiting embodiments described herein may become further apparent upon review of the following description.

SUMMARY OF THE INVENTION

A simplified summary is provided herein to help enable a basic or general understanding of various aspects of exemplary, non-limiting embodiments that follow in the more detailed description and the accompanying drawings. This summary is not intended, however, as an extensive or exhaustive overview. The sole purpose of this summary is to present some concepts related to the various exemplary non-limiting embodiments of the disclosed subject matter in a simplified form as a prelude to the more detailed description that follows.

In consideration of the above-described deficiencies of the state of the art, the disclosed subject matter provides apparatuses, related systems, and methods associated with electronic payments.

According to non-limiting aspects, the disclosed subject matter provides aggregated transactional account functionality configured to receive electronic money transfers associated with one or more of a set of electronic identifying information such as phone, email, instant message, etc., for a user.

In further non-limiting implementations, the disclosed subject matter provides a transfer money plugin or user interface component configured to allow money transfer messages to be sent to a recipient specified from within an existing communications application.

Thus, in various non-limiting implementations, the disclosed subject matter provides systems, devices, and methods that facilitate efficient funds transfer between users, where trust between users can be leveraged to allow for minimal user verification or confirmation of funds transfers (e.g., below a predetermined limit, etc.) as further described herein.

These and other embodiments are described in more detail below.

BRIEF DESCRIPTION OF THE DRAWINGS

The disclosed techniques and related systems and methods are further described with reference to the accompanying drawings in which.

DETAILED DESCRIPTION OF ILLUSTRATIVE EMBODIMENTS

Overview

Figure 1:
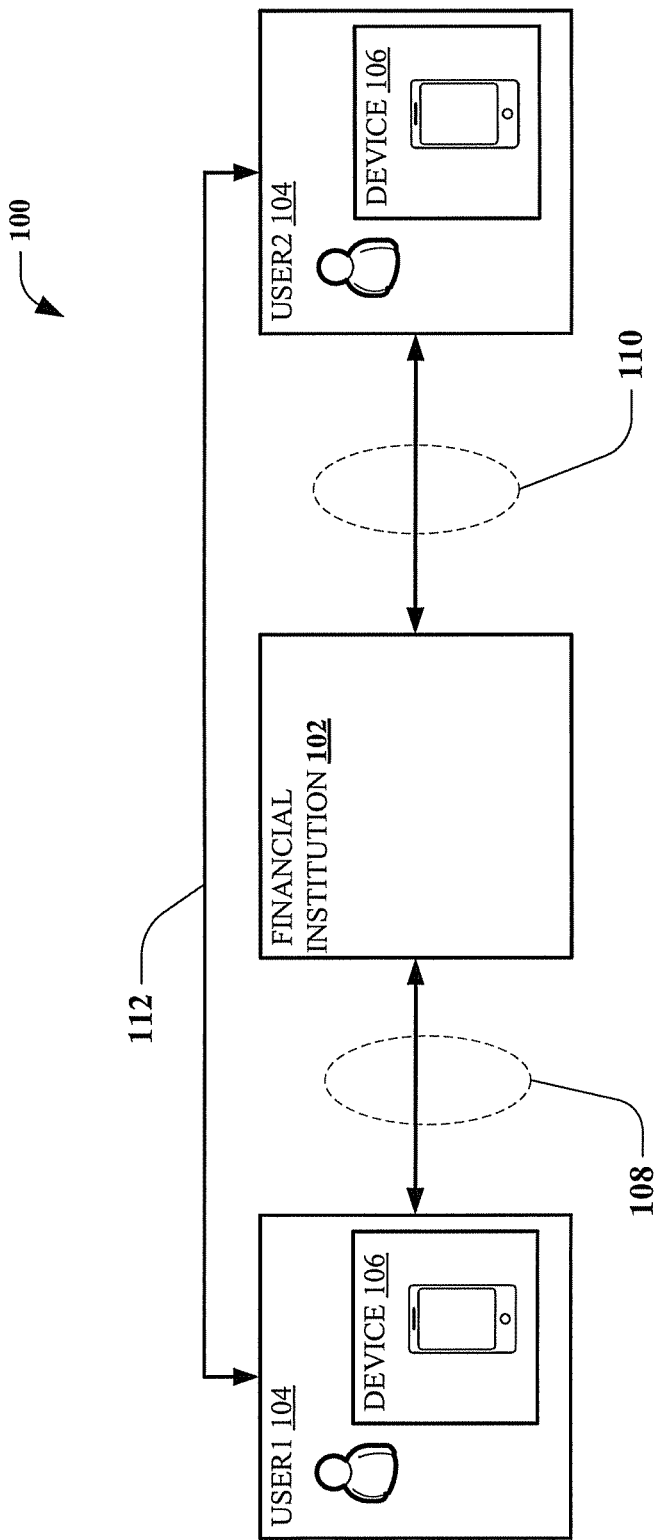
FIG. 1 depicts a functional block diagram illustrating an exemplary environment suitable for use with aspects of the disclosed subject matter.

Simplified overviews are provided in the present section to help enable a basic or general understanding of various aspects of exemplary, non-limiting embodiments that follow in the more detailed description and the accompanying drawings. This overview section is not intended, however, to be considered extensive or exhaustive. Instead, the sole purpose of the following embodiment overviews is to present some concepts related to some exemplary non-limiting embodiments of the disclosed subject matter in a simplified form as a prelude to the more detailed description of these and various other embodiments of the disclosed subject matter that follow.

It is understood that various modifications may be made by one skilled in the relevant art without departing from the scope of the disclosed subject matter. Accordingly, it is the intent to include within the scope of the disclosed subject matter those modifications, substitutions, and variations as may come to those skilled in the art based on the teachings herein.

As used in this application, the terms "component," "module," "system", or the like can refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Also the terms "user," "mobile user," "mobile device," "mobile station," and so on can be used interchangeably to describe technological functionality (e.g., device, components, or subcomponents thereof, combinations, and so on etc.) configured to at least receive and transmit electronic signals and information, or a user thereof, according to various aspects of the disclosed subject matter.

In addition, as further used in this application, the terms "user," "recipient," "payee," "transferee," and "creditor" can be used interchangeably to refer to an intended recipient of a fund transfer request, whereas the terms "user," "sender," "payor," "transferor," and "debtor" can be used interchangeably to refer to an initiator of a funds transfer request, depending on the context. As further used in the application, the term "transactional account" is intended to refer to a deposit account, whether temporary or otherwise, whether virtual or otherwise, held at a bank, a financial institution, or other institution, for the purpose of providing access to funds or to provide a facility to accept or generate funds transfers securely and quickly on demand, through a variety of different channels. Thus, as used herein, the terms "user" and "transferor" when referring to a transactional account and/or a funds transfer can refer to entities (or one or more automated devices or systems, intermediaries, or agents acting for or on behalf of the entities) that can employ aspects of the disclosed subject matter to facilitate the electronic financial interactions as further described herein.

As described above, deficiencies in conventional financial transactions between individuals fail to approximate the experience of a face-to-face cash transaction. For example, some hallmarks of a face-to-face cash transaction include, ease of transacting, trust between parties (e.g., either by personal history, physical proximity of parties, or otherwise, etc.), relatively minor amounts of value to be exchanged, and so on etc.

For example, some hallmarks of a face-to-face cash transaction include, ease of transacting, trust between parties (e.g., either by personal history, physical proximity of parties, or otherwise, etc.), relatively minor amounts of value to be exchanged, and so on etc. Thus, creating similar experiences regarding electronic financial interactions face many challenges as a result of various platforms that bring people closer together such as email, Short Message Service (SMS) or text message, Multimedia Messaging Service (MMS), Skype®, instant messaging (IM) (e.g., ICQ™, AOL® IM or AIM®, etc.), interact through Facebook™, Twitter™, IRC, etc., for example, as well as interacting through various types of devices including fixed and mobile devices, whether wired or wireless.

Figure 2:
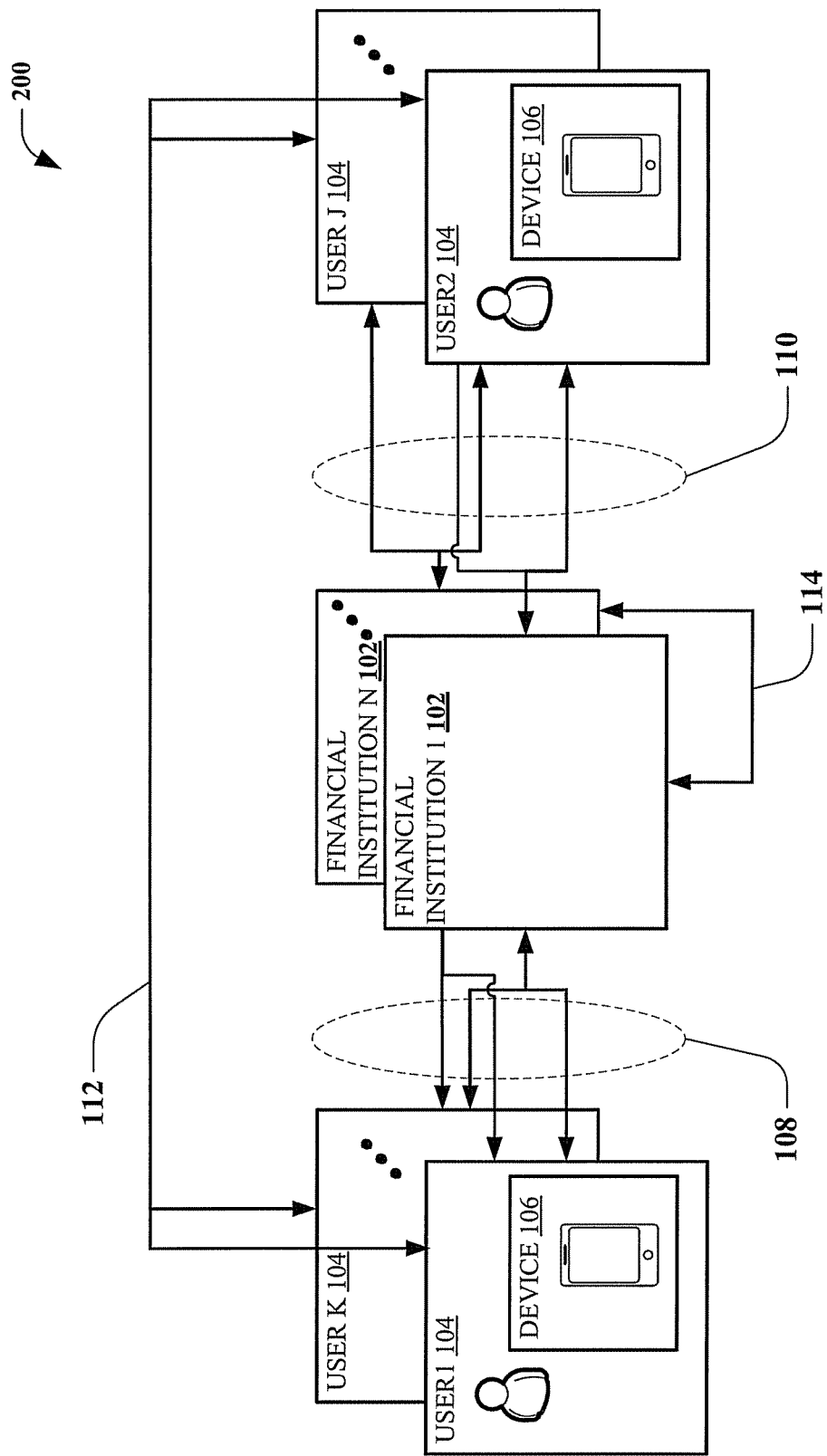
FIG. 2 depicts another functional block diagram illustrating an exemplary environment and demonstrating further non-limiting aspects of the disclosed subject matter.
Figure 3:
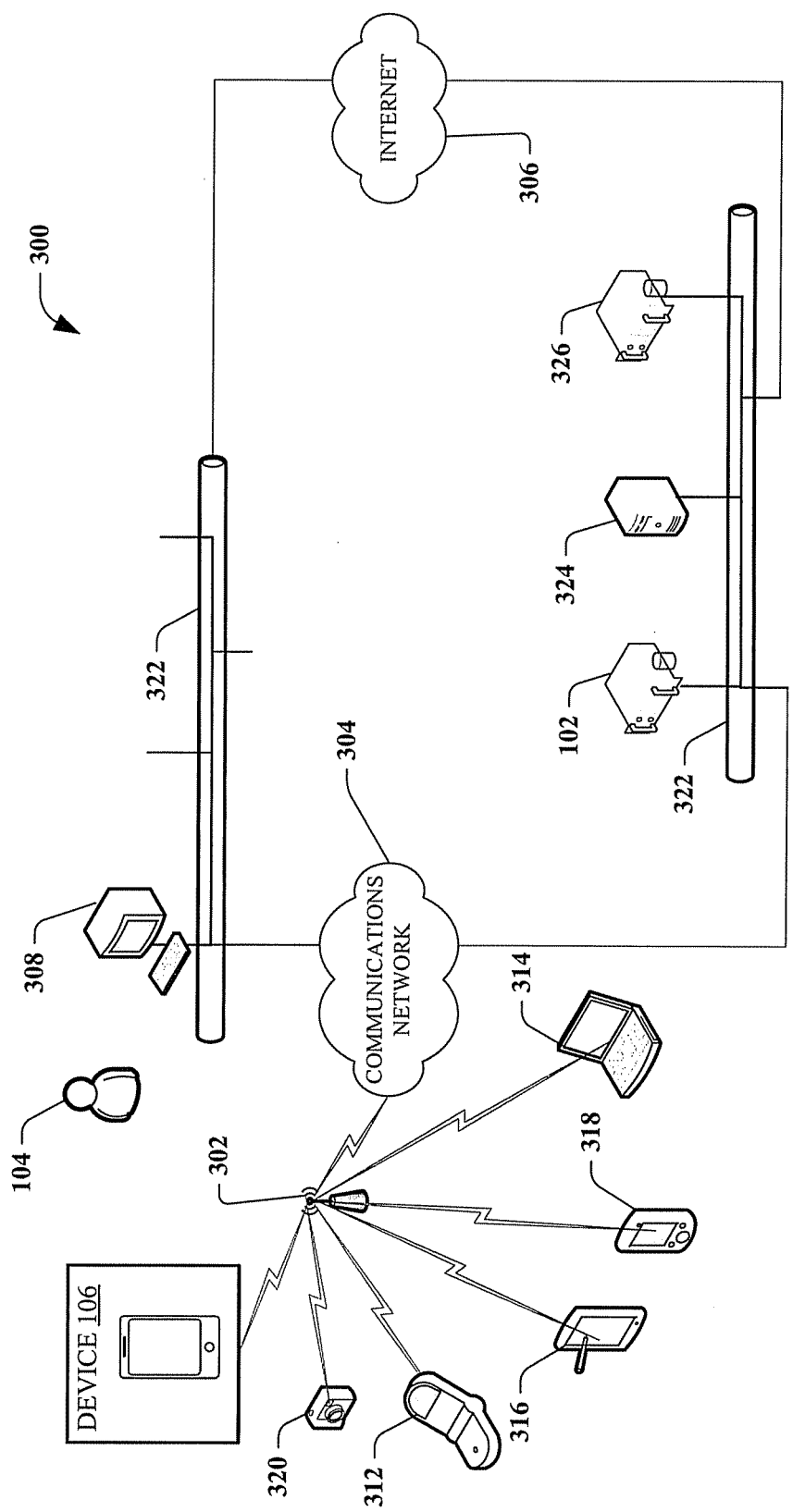
FIG. 3 illustrates an overview of an exemplary computing environment suitable for incorporation of embodiments of the disclosed subject matter.

For example, FIGS. 1-3 demonstrate various aspects of the disclosed subject matter. For instance, FIG. 1 depicts a functional block diagram illustrating an exemplary environment 100 suitable for use with aspects of the disclosed subject matter. For instance, FIG. 1 illustrates a financial institution 102 in communication with user1 104 and user 2 104, each of which users can be associated with a respective device 106, as further described herein. As can be understood, communications of user1 104 (108) and user 2 104 (110) with financial institution 102 can be electronic or otherwise (e.g., face-to-face, written, etc.) as can communications 112 of user1 104 and user 2 104. As a result, FIG. 1 illustrates a simple exemplary environment 100 in which user1 104 can desire to financially transact with user2 104. For instance, in a simple cash face-to-face transaction, where user1 104 wants to transfer funds to user2 104, financial institution 102 can be avoided, assuming that user1 104 has adequate cash on hand and user1 104 and user2 104 are proximate each other. In another instance, users 104 desiring records of associated transactions can also exchange records of the associated transactions such as proof of payment, a receipt, and so on, etc.) via respective devices 106, either concomitantly with an associated funds transfer between user1 104 and user2 104, or otherwise (e.g., appurtenant to a cash transaction, etc.), such as by exchange of digital tokens, signatures on a bill of sale electronic form, or other information that evidences the associated transaction.

Otherwise, in the above example assuming a sender/payor/transferor/debtor such as user1 104 desires making a payment to a recipient/payee/transferee/creditor, such as user2 104. The user1 104 must retrieve funds (cash, certified funds, obtain ability to draft negotiable instruments on an account with the institution, etc.) from an institution, arrange a meeting with the transferee (for untrusted transactions), escrow arrangement (with concomitant fees), or other arrangement to send payment of cash or check, then the user2 104 must then make arrangements to deposit funds into an account (e.g., if by payment is negotiable instrument). FIG. 2 depicts another functional block diagram illustrating an exemplary environment 200 and demonstrating further non-limiting aspects of the disclosed subject matter. Moreover, FIG. 2 depicts the more likely scenario with more than one financial institution 102, and as can be understood, communications 114 between financial institution 1 102 and financial institution N 102 can be electronic or otherwise (e.g., face-to-face, written, etc.). In any event, behind the scenes, there is likely an impersonal web of intractable agreements that governs how many days the funds can be held before becoming available, fee agreements that govern what fees are to be paid for accessing the funds, and so on, etc.

FIG. 3 illustrates an overview of an exemplary computing environment 300 suitable for incorporation of embodiments of the disclosed subject matter. For example, computing environment 300 can comprise wired communication environments, wireless communication environments, and so on. As a further example, computing environment 300 can further comprise one or more of a wireless access component 302, communications networks 304, the internet 306, etc., with which a user 104 can employ any of a variety of devices 106 (e.g., device 308, mobile devices 312-320, and so on to communicate information over a communication medium (e.g., a wired medium 322, a wireless medium, etc.) according to an agreed protocol.

Accordingly, computing environment 300 can comprise a number of components to facilitate electronic payments and/or funds transfers according to various aspects of the disclosed subject matter, among other related functions. While various embodiments are described with respect to the components of computing environment 300 and the further embodiments more fully described below, one having ordinary skill in the art would recognize that various modifications could be made without departing from the spirit of the disclosed subject matter. Thus, it can be understood that the description herein is but one of many embodiments that may be possible while keeping within the scope of the claims appended hereto.

Additionally, while devices 106 (e.g., device 308, mobile devices 312-320, etc.) are shown as a generic network capable device, device 106 is intended to refer to a class of network capable devices that can one or more of receive, transmit, store, etc. information incident to facilitating various techniques of the disclosed subject matter. Note that device 106 is depicted distinctly from that of device 3308, or any of the variety of devices (e.g., devices 312-320, etc.), for purposes of illustration and not limitation.

While for purposes of illustration, user 104 can be described as performing certain actions, it is to be understood that device 106 and/or other devices (e.g., via an operating system, application software, device drivers, communications stacks, etc.) can perform such actions on behalf of user 104. Similarly for users 104 and devices 106, which can be discussed or described as performing certain actions, it is to be understood that computing systems or devices associated with users 104 and devices 106 respectively (e.g., via an operating system, application software, device drivers, communications stacks, etc.) can perform such actions on behalf of users 104 and devices 106.

Accordingly, exemplary device 106 can include, without limitation, networked desktop computer 308, a cellular phone 312 connected to the network via access component 302 or otherwise, a laptop computer 314, a tablet personal computer (PC) device 316, and/or a personal digital assistant (PDA) 318, or other mobile device, and so on. As further examples, device 106 can include such devices as a network capable camera 320 and other such devices (not shown) as a pen computing device, portable digital music player, home entertainment devices, network capable devices, appliances, kiosks, and sensors, and so on. It is to be understood that device 106 can comprise more or less functionality than those exemplary devices described above, as the context requires, and as further described below in connection with FIGS. 7-13. According to various embodiments of the disclosed subject matter, the device 106 can connect to other user devices to facilitate accomplishing various functions as further described herein. In addition, device 106 can connect via one or more communications network(s) 304 to a wired network 322 (e.g., directly, via the internet 306, or otherwise).

Wired network 322 (as well as communications network 304) can comprise any number of computers, servers, intermediate network devices, and the like to facilitate various functions as further described herein. As a non-limiting example, wired network 322 can include one or more financial institution 102 systems (e.g., one or more appropriately configured computing device(s) associated with, operated by, or operated on behalf of financial institution 102, etc.) as described above, that facilitates providing access for a device 106 to software applications or an online services of financial institution 102.

In further non-limiting implementations, a communications provider systems 324 can facilitate providing communication services as further described herein (e.g., email, SMS or text messaging, MMS messaging, Skype®, IM such as ICQ™, AOL® IM or AIM®, etc., Facebook™, Twitter™, IRC, etc.), and which can be employed to facilitate financial interactions according to various non-limiting aspects as described herein.

As a further non-limiting example, wired network 322 can also include systems 326 (e.g., one or more appropriately configured computing device(s) associated with, operated by, or operated on behalf of financial institution 102, or otherwise for the purpose of registering transactional accounts, receiving notifications, receiving funds transfer confirmations, perform a user verifications, completing funds transfers, and so on, as further described herein, as well as ancillary or supporting functions, etc.)

In addition, wired network 322 or systems (or components) thereof can facilitate performing ancillary functions to accomplish various techniques described herein. For example, in wired network 322 or systems (or components) thereof, functions can be provided that facilitate authentication and authorization of one or more of user 104, device 106, presentation of information via a graphical user interface to user 104 concerning funds transfers, etc. as described below. In a further example, computing environment 300 can comprise such further components (not shown) (e.g., authentication, authorization and accounting (AAA) servers, e-commerce servers, database servers, application servers, etc.) in communication with one or more financial institution 102 systems, communications provider systems 324, and/or systems 326, and/or 106 to accomplish the desired functions.

Thus, as further illustration of financial interactions related to the above exemplary environments, the following presents various exemplary aspects as a prelude to describing further non-limiting aspects of the disclosed subject matter. For instance, regarding trust between parties and analogies to face-to-face cash transactions, parties to electronic financial interactions can choose various forms of user verification. For instance, according to a non-limiting aspect, parties to a transaction can authenticate a recipient of a money transfer by, for example, a mobile device ID (phone number, hardware ID, or other, and so on, etc.), an email address, or other ID as described herein to authorize such transactions.

As an example, consider an entity A (e.g., user1 104) that can register with a system, such as a unified charging system (UCS) service, a funds management system, a funds management service, and so on, that can be configured to facilitate transfer of an amount of money to an entity B (e.g., user2 104). Also consider that entity B (e.g., user2 104), not necessarily being registered with the system or service, yet entity B (e.g., user2 104) still desires to receive the amount of money. In a face-to-face transaction, simple proximity, trust based on past transaction history, and/or other considerations of the relationship between entity A (e.g., user1 104) and entity B (e.g., user2 104) would serve to facilitate faith that the transaction should proceed (e.g., payment made for goods or services either prospectively or retroactively, simple payment made to a child to meet child's financial needs, etc.).

In conventional electronic financial interaction systems, trust between parties is not presumed as a precursor to prospective financial transactions, and much effort is expended in verification of identification, confirming authority for financial actions, and so on. However, for transactions involving preexisting trust between transacting parties and/or for amounts below a certain threshold of risk, parties can desire to opt-in to a financial interaction system having a lower threshold of user verification, lower amounts at risk, and/or combinations thereof. Thus, as described, in at least one aspect, parties to a transaction can choose to authenticate a recipient of a money transfer by, for example, a mobile device ID (phone number, hardware ID, or other, and so on, etc.), an email address, or other ID as described herein to authorize such transactions.

Alternatively, a system, a UCS service, a funds management system or service, and so on can generate a random password and/or a sender/payor/transferor/debtor such as entity A (e.g., user 1 104) can generate a random password that can be sent to the recipient/payee/transferee/creditor such as entity B (e.g., user2 104) to facilitate electronic financial interaction. Thus, in a non-limiting example, entity B (e.g., user2 104) can receive a notification in his or her email, in a SMS message, another message protocol specifically directed to financial transfers, an instant message, etc., which can include a uniform resource locator (URL) or a link such as a web link to an "accept transfer" page or resource. In various aspects, this resource can be a secured page or resource, which can verify user identity of entity B (e.g., user2 104) based on the device ID, account ID, email address, password, or other ID as described herein from which the request to access the "accept transfer" page or resource was initiated.

In other non-limiting alternative aspects, a notification (e.g., to entity B (e.g., user2 104)) can include requesting a URL or link to request a system generated password, a service generated password, and so on. In this case, a recipient/payee/transferee/creditor such as entity B (e.g., user2 104) could be allowed to enter information where he or she would like to forward amounts to be received without the need for registration with the system, the service, and so on and/or without the need for any additional verification of identity to any other account, like mobile phone account, bank account, Western Union, etc. Thus, entity B (e.g., user2 104) could be required to enter password received from the system, the service, and so on. This way, entity B (e.g., user2 104) could be allowed to receive the intended transfer without need for personal visit to any office and to show ID, etc.

In various aspects, because the sender/payor/transferor/debtor has opted to for minimal user verification and/or limited risk by limiting amounts transacted for and/or transacting with trusted parties, user verification can be made based on comparing IDs entered by sender/payor/transferor/debtor such as entity A (e.g., user1 104) and IDs from where recipient/payee/transferee/creditor such as entity B (e.g., user2 104) arrived to "accept transfer" page or resource. Note that a sender/payor/transferor/debtor could choose several IDs at the time of requesting a transfer and submitting a notification email, SMS, etc.

Accordingly, such systems and methods of user verification can advantageously enable fast and convenient transfers of money to a set of contacts on a device (e.g., mobile device) for device users who have opted in, via a simple interface, and a simple verification exchange can be facilitated that for transfers not exceeding a predetermined maximum amount (e.g., a predetermined maximum amount of money that can be transferred for a given time period between two individuals, etc.). For instance, entity A (e.g., user1 104) can selects entity B (e.g., user2 104) from a set of contacts. If both entity A (e.g., user1 104) and entity B (e.g., user2 104) have opted in (e.g., registered on the system or service), entity A (e.g., user1 104) can in one action initiate a transfer to entity B (e.g., user2 104), for example, by sending a money transfer notification as described above (e.g., email, SMS, another message protocol specifically directed to financial transfers, an instant message, etc.).

As a further non-limiting example, entity A (e.g., user1 104) can enter in the amount of money to transfer up to the predetermined limit, and the system or service can facilitate the communication accordingly (e.g., with the above described variations on user verification less than requiring full photo ID), a notification can be delivered to entity B (e.g., user2 104), and entity B (e.g., user2 104) can confirm or deny the money transfer. Such predetermined limits can include, without limitation, a maximum total per diem limit on the ability to transfer funds in the system or service, and/or limits that are more sophisticated based on one or more of the sources and/or destinations of funds transferred.

In any event, one advantage of such a system or service is that a recipient/payee/transferee/creditor such as entity B (e.g., user2 104) is not required to be registered with the system or service, and/or is not required to be ID verified in-person in order to receive funds. Of course, a sender/payor/transferor/debtor such as entity A (e.g., user1 104) would be registered with the system and would initiate the transfer, presumably to a trusted counter-party, and in order to send funds entity A (e.g., user1 104) would be allowed to affiliate an account to one or more of his or her IDs (e.g., email address, mobile ID or phone number, Facebook™ ID, IM account ID, or other chosen ID, etc.).

In addition to the above variations, the system or service could also facilitate setting system or service options such as, without limitation, a predetermined transaction limit (e.g., periodic number or dollar amount, per transaction limits, types of verification according to amount, intended recipient, etc., further restrictions on funds usage, and so on, etc. As a non-limiting example, entity A (e.g., user1 104) can choose a personal identification number (PIN) code to authorize a sending money transaction, which PIN is desired to be requested each time money is being attempted to be sent.

Accordingly, with attention to the hallmark of a face-to-face transaction that is that they are typified by occurring between parties having a preexisting trusted relationship, the above minimized user verification can more closely approximate the face-to-face cash transaction by eliminating some of the formality and inefficiencies associated with conventional electronic financial interaction schemes.

As mentioned, the ability to efficiently transfer money electronically without excessive interaction with financial institutions is another hallmark of cash transactions. Cash is fungible, highly portable, and easily transferable. Thus, a system or service for electronic financial interactions should support as many electronic communication forms as conceivable to maintain the same fungibility, portability, and transferability as cash (or as near as possible). The system or service should not be exclusively tied to any particular device, service, platform, and so on, and interoperability should be a primary feature. Thus, such a system or service can be a combination of sending funds within an IM interface (e.g., Skype®, ICQ™, etc.) or using other real-time or near real-time messaging capabilities such as SMS, etc., sending funds within an online application interface, sending funds by another message protocol specifically directed to financial transfers such as a Money Transfer Service (MTS).

In various non-limiting aspects, portions of such a service or system can comprise communication service components of a mobile phone, mobile web, or other mobile communication system, using standardized communications protocols that allow the exchange of lightweight messages between fixed and/or mobile devices similar to SMS and MMS. However, instead of transferring text messages such as in the case of SMS or multimedia messages and text in case of MMS, a MTS can be designed to transfer funds from an account affiliated with a sender/payor/transferor/debtor such as entity A (e.g., user1 104) to an account maintained by a communications provider on behalf of potential recipients. In addition, a notification system for incoming funds transfer can be configured such that notifications can be delivered via various facilities depending on user preference (e.g., email, SMS, web alerts, etc.). Thus, a registered account owner can be provided with the ability to configure his or her account in such a way that all incoming transfers can be automatically forwarded to an account affiliated with the system or service or a third-party account (e.g., credit account, debit account, savings account, etc.). In other non-limiting aspects, a registered account owner can request manual money transfers between a registered account owner and third-party accounts and transfers to other accounts, such as other registered account owners, make payments for utility services, for credit, etc.

In this regard, a Money Transfer Messaging Service (MTMS) can facilitate mobile services similar MMS and SMS, where, instead of sending and receiving multimedia or text messages, a user can employ MTMS to transfer money. As a non-limiting example, consider a user such as entity A (e.g., user1 104) selecting a recipient on a mobile device, entering an amount, and pressing send to initiate a money transfer. The transfer amount can be subtracted from the account affiliated with the sender/payor/transferor/debtor (e.g., entity A (user1 104)), can be deposited into a virtual or temporary account, on behalf of a prospective recipient, and can be marked as dedicated for specific recipient. After the recipient/payee/transferee/creditor such as entity B (e.g., user2 104) confirms transfer, the amount can be deposited into account selected by entity B (e.g., user2 104) at the time of confirmation (or otherwise disposed of according to one or more of the parties' intentions, restrictions, and so on, etc.).

Thus, MTMS can result in an implementation of a lightweight protocol, similar to SMS for text to reduce payload, where possible, for example, for electronic financial interactions. For instance, for transactions that do not require a person to validate user identity with photo ID (or are not desired to require user identity validation with photo ID), as described above, a lightweight MTMS protocol can provide a simple transport that can convey money transfer messages according to a predefined messaging exchange. As a non-limiting example, such a protocol, on the send side, could allow a user such as entity A (e.g., user1 104) to merely specify a source of funds and an amount to be transferred, with a MTMS packing such data as packetized messages that can communicate the amount without details such as source of funds to the transferee.

On a transferee's device, in response to receiving the packets forming the message, a notification of money transfer can request the transferee to validate the transaction, can facilitate registering the transferee with the system or service to collect if not already signed up, or could provide alternative options to collect transferred funds. In a further non-limiting illustration, such a protocol could, as an option, enable the transferee to specify from a list, for example, which deposit account to deposit the transfer of money, the details of which selection can be kept private from the transferor. In addition, regarding user verification as described above, an embodiment of the protocol could also automatically send back to the system or service the ID (e.g., entity B (user2 104) mobile device ID, Skype® ID, phone number, email address, SMS exchange, etc.,) which is intended by sender/payor/transferor/debtor (e.g., entity A (user 1 104)) to verify entity B (e.g., user2 104) as the intended recipient in the transaction, for example, for transaction below a predetermined threshold amount.

As can be understood with devices ubiquitously supporting such a protocol (e.g., MTMS, etc.), a large number of transactions can be conducted. Moreover, such a lightweight, open protocol, that any device can support, and which can be implemented in parallel to or alongside SMS, MMS, etc. wherever such other protocols are implemented, or independently for any financial application that would like to leverage the system of users and their pre-defined relationships, can more closely approximate the cash transaction by approximating the same fungibility, portability, and transferability as cash (or as near as possible). In addition, as e-wallets are being conventionally implemented in mobile devices, a recipient can receive funds into an e-wallet associated with his or her ID (e.g., mobile phone number, email address, Facebook™ account, etc.), and then can go to any online resource and conduct purchases, navigate online to bank accounts and make payments or transfers between accounts, use stored value and/or credit/debit cards affiliated with the e-wallet, use short-range networks to make purchases such as at vending machines, etc.

Additionally, it can be understood that the system or service as described above can recognize MTMS as such, and not simply understood and/or forwarded to a recipient as regular SMS or MMS. As a non-limiting example, the system or service as described above can recognize the transfer amount and, in a non-limiting embodiment where recipient confirmation is not required, can directly deposit funds into a designated account of a registered recipient account and/or can send a default or a sender defined notification to recipient. Alternatively, for an unregistered recipient, and/or where acceptance of transfer or confirmation is not required, the system or service as described above can provide instructions to recipients and/or links or URLs, login information, and so on, where recipient can claim his or her money.

It can be understood that the foregoing descriptions are merely intended to provide an illustration of various implementations of systems or services associated with electronic financial interactions intended to more closely approximate the experiences and/or preconditions of face-to-face cash transactions as a prelude to describing the various non-limiting implementations of the disclosed subject matter.

Given the foregoing non-limiting illustrations, in various non-limiting implementations, the disclosed subject matter provides aggregated transactional account functionality configured to receive electronic money transfers associated with one or more of a set of electronic identifying information such as phone, email, instant message, etc. for a user. As can be understood from the foregoing exemplary illustrations, with an aggregated transactional account, such as a deposit account, electronic money transfers can be associated with virtually any user electronic IDs (e.g., user identifying information, etc.) such as phone numbers and/or accounts, email addresses, instant message account IDs, etc. to facilitate electronic financial interactions such as money transfers, and so on. For example, an exemplary deposit service can facilitate a user receiving funds transfer (e.g., money transfers) at his or her electronic IDs, such as phone numbers and/or accounts, email addresses, instant message account IDs, etc., described above. In a further non-limiting example, according to various embodiments, a user can register and configure an account with such a service, so that any transfers addressed to virtually any or his or her IDs can be deposited into a designated account (e.g., an account designated at time of registration, etc.).

In yet another non-limiting example, upon registration with such a service, a user can add his or her various items of user identifying information (e.g., IDs such as email addresses, phone numbers, IM IDs such as Skype®, Facebook™, etc.) and can designate a deposit account where funds can be deposited. In still other non-limiting implementations when a prospective transferor of funds (e.g., entity A (user1 104)) sends him or her money (e.g., initiates a funds transfer using the described system, etc.), he or she receive can receive a notification of the funds transfer request. According to still further non-limiting implementations, he or she does not necessarily need to confirm the funds transfer (e.g., depending on the context such as amounts to be transferred, predetermined limits, risk profiles, verification levels desired, etc), and funds can be automatically deposited into the designated deposit account selected during registration.

As noted, on the transferor side, a prospective transferor can be allowed to select a source for funds for conducting the transfer request without necessarily revealing such details (e.g., such details can be omitted, removed, or otherwise obscured, etc. in any notification to the user/recipient), whereas on the intended recipient side, the user can be allowed to specify a funds destination, without revealing the details of which deposit account was selected by the user/recipient. Thus, in various non-limiting implementations, such systems or services (or supporting components such as a user interface component, etc.) can facilitate easy acceptance of prospective funds transfers (either automatically or otherwise) made on the basis of specifying one or more items of user identifying information, which items of identifying information can enable a transferor of funds (e.g., entity A (user1 104)) to specify the user (e.g., entity B (user2 104)), an intended fund transfer recipient, an associated account, and so on, etc., in requesting a funds transfer to the user. In addition, designation of destination accounts can be made without revealing such details. Thus, various embodiments of the disclosed subject matter can approximate the experiences of a cash transaction for trusted financial interactions by emphasizing the quick and efficient exchange of value, while limiting the painful mechanics of all the various formalities of conventional electronic payment systems.

Overall, an exchange and messaging protocol according to the disclosed subject matter can achieve selection of a source of funds from a set of sources, an amount, and a recipient on the transferee side, without revealing the particular source of funds used, and on the deposit side, achieves selection of a deposit account from a set of creditors, such as credit card account, or investment account (e.g., a bank account), without revealing the deposit account selected. Furthermore, variations of acceptance of the transfer by the transferee, and corresponding verification level specified for the transaction can be made to support varying levels of trusted transactions.

As described above, according to various non-limiting implementations, verification of the funds transfer request (e.g., verifying the request was validly made and between the intended entities) can be made based on comparing IDs entered by sender and IDs from where the user or recipient arrived to an "accept transfer" page or other confirmation resource. Of course, a sender can enter several possible IDs at the time of initiating a funds transfer request (e.g., email, SMS, etc.). In addition, a prospective recipient could have several IDs associated with the transactional account intended for the transfer request, such that the IDs the sender specified and the IDs the recipient associated could be cross-referenced. Thus, the disclosed subject matter can advantageously enable funds transfers to recipients without requiring the recipients to register with the service in-person in order to receive funds.

As further described herein, notifications of an incoming funds transfer may be configured to be delivered to any or all systems per user's discretion, and a registered account owner can be allowed to configure his or her account in such a way that incoming transfers can be automatically forwarded to affiliated account or a third-party party account (e.g., a credit account, a debit account, a savings account, etc.). In addition, as further noted, a registered account owner can request manual money transfers between affiliated accounts and/or third-party accounts and other accounts (e.g., such as owner accounts of other registered members, make payments for utility services, for credit, etc.).

In further non-limiting implementations, the disclosed subject matter provides a transfer money plugin or user interface component configured to allow money transfer messages to be sent to a recipient specified from within an existing communications application. As an illustrative example, an add-on or plugin user interface component can be added to an existing such as a communications application for a communication service (e.g., Skype®, email application, IM application, Facebook™, Twitter™, SMS application, web browser, application built on a money transfer messaging service such as MTMS as described above, etc.). Thus, a sender or prospective transferor can then affiliate an account (e.g., a withdrawal account, etc.) with a service provider associated with the communication service, the communications application, and/or the transfer money plugin or user interface component. Accordingly, when a sender or prospective transferor wishes to transfer money to a trusted individual, the sender or prospective transferor can select one or more recipients (e.g., from a mobile device contact list, a buddy list, an electronic phone book, an electronic address book, a follower list, a friend list, etc.) and can enter the amount to be transferred. Then, the sender or prospective transferor can confirm the transfer information by clicking a plugin user interface component (or otherwise indicating acceptance of the transfer terms, etc.) icon to initiate the funds transfer.

On the recipient side, based on the funds transfer initiated in the transfer money plugin or user interface component, a notification can appear for a recipient (e.g., such as in a dialog box for the communications application or the plugin user interface component, via SMS message, email, and so on, etc.), which can include a link to a confirmation resource such as registration page for a recipient or an accept transfer page for registered account owners or users. For instance, as a non-limiting example, at an accept transfer page a recipient can selects where the funds transfer is to be deposited, as further described herein. As further described above, a prospective recipient does not have to be a registered account owner or user. Thus, such nonregistered account owners can be provided instructions about how to register for a transactional account capable of accepting the funds transfer, or the nonregistered account owners can be provided instructions about how to accept the funds transfer without registering for an account on the system or service.

While the above description of the money transfer plugin or user interface component is described in terms of add-on functionality to an existing application, it can be understood that such functionality could be built into the application without the need for add-on or plugin functionality. As a further non-limiting illustration, the described transfer money plugin or user interface component can comprise an icon or button in a virtual communication tool that can enable the sender to send money to a recipient within the given communication tool. For example, a communication tool such as Skype®, Facebook™, ICC, a mobile IM interface, and so on can include a Send Money button or icon through which a sender can select a recipient (such as any person in the sender's address book, etc.), which can open a dialogue window between the sender and the recipient. The Sender can then press invoke functionality that can trigger a dialogue box with options to enter a transfer value amount and or other options (e.g., such as a text message, multimedia message, etc.). After the required information is entered and submitted, a recipient can receive a notification and link to receive the transferred amount as previously described.

In another non-limiting implementation, the transfer money plugin or user interface component can provide a near distance exchange capability among users having physical proximity that more closely approximates a face-to-face cash transaction. As an example, a lightweight user verification protocol can be implemented between two user devices that are near one another (e.g., by enabling near field communication, such as Bluetooth®, or other near range communication capability, etc.) or by otherwise determining physical proximity (e.g., verification of global positioning system (GPS) location similarity as being near, triangulation, same cellular communication tower, etc.). Thus, if users are close to one another, it can be understood that there is greater likelihood of trust and that they intend their actions. As previously described, with a financial transfer limit (e.g., daily limit, total transfer limit, more sophisticated limit, etc.) being adhered to, for example, the transfer money plugin or user interface component can provide a near distance exchange capability among users having physical proximity while still providing reasonable protections against risk of loss.

As a non-limiting example, if an iPhone® user walks up to an Android™ user, either can invoke the plugin or user interface component to perform an exchange of funds via a money transfer protocol implemented by the respective plugins (e.g., as previously described, or otherwise, etc.) that can enable a simple verification of users based on one or more of proximity of devices and other factors, such as various items of user identifying information as described herein and corresponding selection of that device from an interface enabling the device to device (and therefore user to user) transfer of money. As a further non-limiting example, whereas a recipient having an application supporting the above functionality installed on his or her device can receive the funds transfer as described above, if a prospective recipient does not have the application functionality installed, he or she can receive a notification at his or her device informing him or her about the transfer as also described above. For instance, the notification can include a link to installation instructions (e.g., for a system able to recognize the device, etc.) and/or provide a proper link or message saying application is not available for that device), and/or instructions on how to sign up with a system or service to receive money on the device or instructions with alternative methods of how to receive funds transfer, (e.g., offline installation, alternative receipt or redemption methods, etc.).

In various non-limiting implementations, until funds transfers are received by intended recipients, funds transfers can be withdrawn from a recipient account or temporary and held in temporary virtual safe. For instance, in various embodiments, the disclosed subject matter provides the ability for a father to deposit $10 into his son's Skype® account by placing a restriction to what deposit account the transferred money can go, and the recipient can be forced to either accept the money into the Skype® account, or reject the payment. Likewise, the disclosed subject matter allows deposits to be made without requiring recipient confirmation, as previously described (e.g., directly into a designated account, a temporary account, etc.).

Moreover, as further described above, regarding FIGS. 1-3 and discussion of MTS, MTMS, and so on, various non-limiting embodiments of the disclosed subject matter can employ messaging, messages, services, applications, and/or functionality, and so on that can employ a money transfer protocol, similar to such protocols as MMS, SMS, etc., but where the money transfer protocol can be designed for the transfer of money, as further described above, As a result, notifications, confirmations, and/or various other messages, information, data, and/or commands, and so on, can be transferred, sent, receive, according to a money transfer messaging protocol that can package a message designed to transfer money, which can include as a payload, without limitation, user identifying information about a transferor (e.g., entity A (user1 104)), user identifying information about a recipient (e.g., entity B (user2 104)), a fund transfer amount, a currency type, any limitations or restrictions on the fund transfer, and/or any combinations were subsets thereof, and without revealing the particular source of funds used by the transferor, and/or without revealing the particular destination of funds desired by the recipient, etc.

Figure 4:
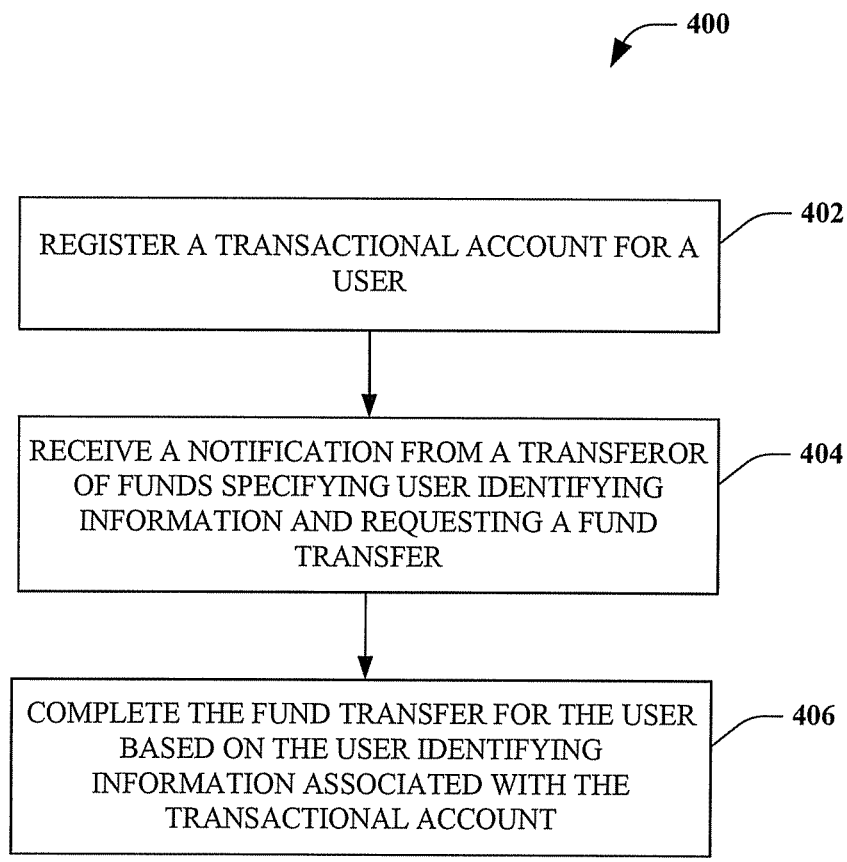
FIGS. 4-6 depict flowcharts of exemplary methods according to particular non-limiting aspects of the subject disclosure.
Figure 5:
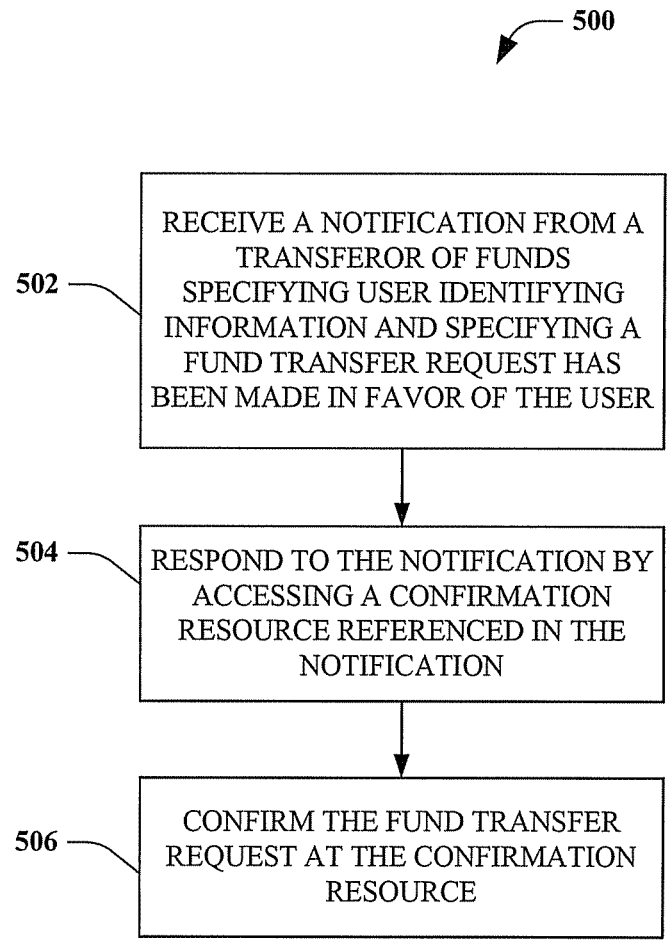
Figure 6:
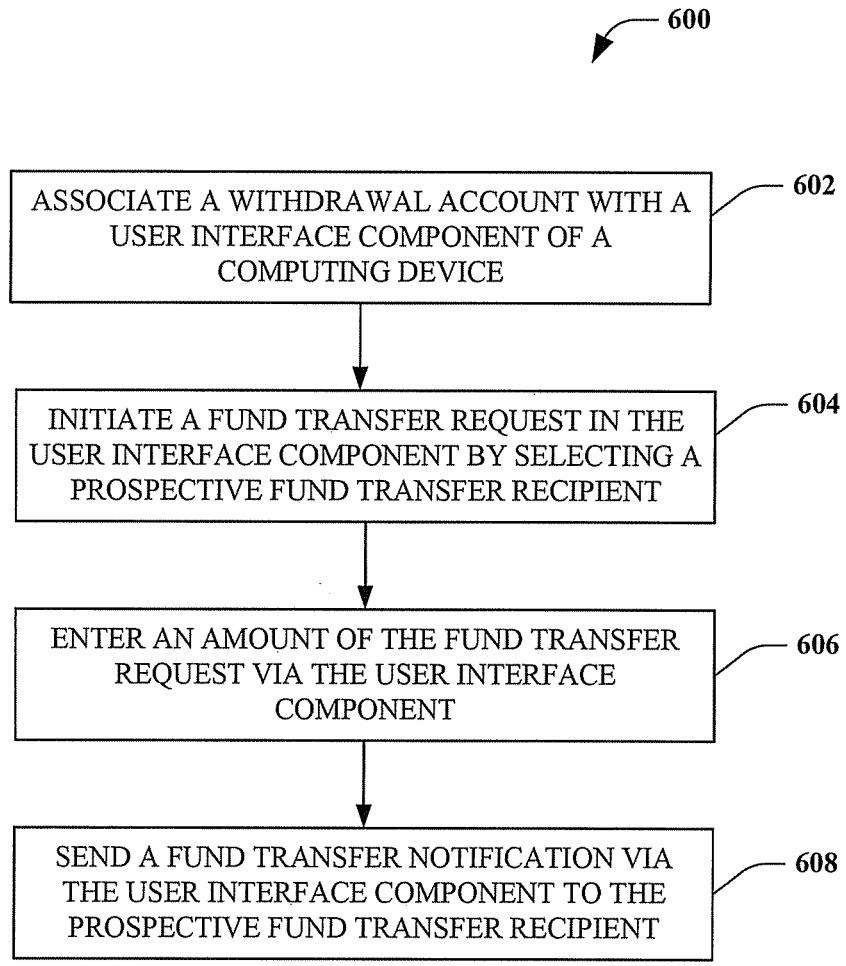

In view of the exemplary embodiments described supra, methods that can be implemented in accordance with the disclosed subject matter will be better appreciated with reference to the flowcharts of FIGS. 4-6. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be understood that various other branches, flow paths, and orders of the blocks, can be implemented which achieve the same or a similar result. Moreover, not all illustrated blocks may be required to implement the methods described hereinafter. Additionally, it should be further understood that the methods disclosed hereinafter and throughout this specification are capable of being stored on an article of manufacture to facilitate transporting and transferring such methods to computers, for example, as further described herein. The term article of manufacture, as used herein, is intended to encompass a computer program accessible from any computer-readable device or media.

Exemplary Methods

FIGS. 4-6 depict flowcharts of exemplary methods according to particular non-limiting aspects of the subject disclosure. For instance, FIG. 4 depicts a flowchart of exemplary methods 400, according to particular aspects of the subject disclosure. For instance, at 402 a transactional account for a user can be registered as further described herein regarding FIGS. 1-3, for instance. As a non-limiting example, registering the transactional account can include associating various items of user identifying information with the transactional account, wherein each item of user identifying information can enable a transferor of funds (e.g., entity A (user1 104)) to specify a user (e.g., entity B (user2 104) as a particularly intended fund transfer recipient for a prospective fund transfer request, etc.), an intended fund transfer recipient, an associated account, and so on, etc., in requesting a fund transfer to the user. In a further non-limiting example, associating items of user identifying information with the transactional account can also include associating a mobile device ID, a mobile phone number, a mobile account number, an instant message ID, an email address, an online messaging account ID, an online voice account ID, a money transfer service account ID, or a transactional account number, and/or any combination thereof, as well as other suitable items of user identifying information (e.g., as described herein or otherwise, etc.) that can enable the transferor of funds (e.g., entity A (user1 104)) to specify a user (e.g., entity B (user2 104) as a particularly intended fund transfer recipient for a prospective fund transfer request, etc.), an intended fund transfer recipient, an associated account, and so on, etc., in requesting a fund transfer to the user.

Additionally, in further non-limiting implementations of exemplary methods 400, the registering the transactional account for the user can also include presenting instructions to the user regarding creating the transactional account based on a prior fund transfer request associated with the user, can include designating a deposit account associated with the user where the fund transfer is to be deposited, and can include specifying transactional account limitations including a predetermined value (e.g., below which the fund transfer can be completed without receiving confirmation from the user, etc.), whether to obscure a destination of the fund transfer, or a verification level for the fund transfer, and so on, etc. as previously described herein.

In addition, at 404, methods 400 can further include receiving a notification from a transferor of funds (e.g., entity A (user1 104)) specifying a subset of items of user identifying information and requesting the fund transfer as further described herein, regarding FIGS. 1-3, for instance. In various non-limiting examples of methods 400, the receiving the notification from the transferor of funds (e.g., entity A (user1 104)) can include obscuring or removing information regarding a source of the fund transfer, as further described herein regarding FIGS. 1-3, for example. In addition, further non-limiting examples of methods 400 can include receiving the notification from the transferor of funds, which can include receiving a message conforming to a money transfer messaging protocol, as further described above. For instance, receiving the message can include receiving a subset of the items of user identifying information, a subset of items of transferor identifying information, and/or an amount of the fund transfer in the message, as well as other information, data, commands, and so on, intended to effect the funds transfer, or which are related thereto.

Moreover, at 406, methods 400 can include completing the fund transfer for the user based on the subset of user identifying information associated with the transactional account as further described herein, regarding FIGS. 1-3, for example. For instance, in exemplary embodiments of methods 400, the completing the fund transfer can also include receiving confirmation from the user based on the user identifying information associated with the transactional account.

FIGS. 5-6 depict further exemplary flowcharts of exemplary methods according to still further non-limiting aspects of the disclosed subject matter. For instance, FIG. 5 depicts an exemplary flowchart of methods 500 of accepting the fund transfer. For instance, at 502, methods 500 of accepting a fund transfer can comprise receiving a notification (e.g., on a computing device associated with a user, etc.) from a transferor of funds (e.g., entity A (user1 104)) specifying one or more items of user identifying information. As a non-limiting example, the specifying the one or more items of user identifying information can include specifying user identifying information, as previously described, that can enable the transferor of funds (e.g., entity A (user1 104)) to specify the user (e.g., entity B (user2 104)), an intended fund transfer recipient, an associated account, and so on, etc., in requesting a fund transfer to the user.

In a further non-limiting example, specifying user identifying information can also include associating a mobile device ID, a mobile phone number, a mobile account number, an instant message ID, an email address, an online messaging account ID, an online voice account ID, a money transfer service account ID, or a transactional account number, and/or any combination thereof, as well as other suitable items of user identifying information (e.g., as described herein or otherwise, etc.) that can enable a transferor of funds (e.g., entity A (user1 104)) to specify the user (e.g., entity B (user2 104)), an intended fund transfer recipient, an associated account, and so on, etc., in requesting a fund transfer to the user. In other non-limiting implementations, the receiving the notification can include receiving a password generated to allow collection of the fund transfer, as previously described herein, regarding FIGS. 1-3, for example. In still other non-limiting examples, the receiving the notification can also include obscuring or removing information regarding a source of the fund transfer from the user, as well as receiving a notification that conforms to the money transfer messaging protocol, as described herein.

In addition, at 504, methods 500 of accepting the fund transfer can also comprise responding to the notification by accessing a confirmation resource referenced in the notification, as further described herein. As a non-limiting example of methods 500, accessing a confirmation resource referenced in the notification can include accessing a secure online resource configured to allow confirmation of the fund transfer, accessing instructions about how to register for a transactional account capable of accepting the fund transfer, and/or accessing instructions about how to collect the fund transfer in lieu of creating the transactional account, or combinations thereof. In yet other non-limiting implementations of methods 500, the responding to the notification can include sending a message conforming to a money transfer messaging protocol to the confirmation resource, as described above, where the message can include a subset of items of user identifying information, a subset of items of transferor identifying information, and an amount of the fund transfer.

Moreover, at 506, methods 500 can further include confirming the fund transfer request at the confirmation resource from the computing device. In a non-limiting example of methods 500, the confirming the fund transfer request can also include confirming the fund transfer request based on a subset of the items of user identifying information, as well as obscuring or removing information regarding a destination of the fund transfer from the transferor of funds (e.g., entity A (user 1 104)).

In yet other non-limiting examples, methods 500 can also comprise, for an amount of the fund transfer below a predetermined value, abstaining from responding to the notification, accessing the confirmation resource, or confirming the fund transfer request, and/or receiving the fund transfer according to a predetermined agreement, or any combination thereof, as described above. In still other non-limiting implementations of methods 500, the methods can further comprise registering for the transactional account including designating a deposit account associated with the user where the fund transfer is to be deposited, as previously described herein.

In further non-limiting embodiments of the disclosed subject matter, FIG. 6 depicts an exemplary flowchart of methods 600 of initiating an electronic fund transfer, for example, via a transfer money plug-in or user interface component, as described above. For instance, at 602, methods 600 of initiating an electronic fund transfer can comprise associating a withdrawal account of a user with a user interface component of a computing device (e.g., a computing device 106 associated with the user 104, etc.). In a further non-limiting example of a method 600, the associating the withdrawal account of the user with the user interface component can comprise affiliating a transactional account having predetermined limitations, as previously described. For instance, predetermined limitations can include a predetermined value, below which, confirmation of the prospective fund transfer recipient is not required, whether to obscure the fact that the withdrawal account is a source of the fund transfer request, or a verification level for the fund transfer request, and so on as well as other limitations as described above.

In yet other non-limiting examples, at 604 methods 600 can also include initiating a fund transfer request in the user interface component by selecting a prospective fund transfer recipient. As a non-limiting example, the selecting the prospective fund transfer recipient can include selecting the prospective fund transfer recipient from a mobile device contact list, a buddy list, an electronic phone book, an electronic address book, a follower list, or a friend list, as so on, etc., as further described herein. In addition, in further non-limiting implementations of methods 600, the selecting the prospective fund transfer recipient can also include specifying identifying information of the prospective fund transfer recipient, as previously described, including specifying a mobile device ID, a mobile phone number, a mobile account number, an instant message ID, an email address, an online messaging account ID, an online voice account ID, a money transfer service account ID, or a transactional account number, and any combinations thereof, and so on, etc.

At 606, non-limiting implementations of methods 600 can further comprise entering an amount of the fund transfer request via the user interface component.

In addition, at 608, further exemplary embodiments of methods 600 can include sending a fund transfer notification via the user interface component to the prospective fund transfer recipient. In a non-limiting example, the sending the fund transfer notification via the user interface component can comprise sending the fund transfer notification via the communications service, or another related or on related communication service. In a further non-limiting example, a prospective fund transfer recipient can be selected via the user interface component associated with the communication service such as SMS messaging (e.g., from an SMS messaging application contact list, etc.), whereas the fund transfer notification can be sent to the perspective fund transfer recipient as an SMS messaging and/or as an e-mail message, or other communications service, either in lieu of, or in addition to SMS messaging, and so on. Moreover, in yet other non-limiting examples of methods 600, the sending the fund transfer notification via the user interface component can also include sending a reference to a confirmation resource available to the prospective fund transfer recipient to confirm the fund transfer request, as previously described herein, for example, regarding FIGS. 1-3. In yet other exemplary embodiments of methods 600, sending the fund transfer notification via the user interface component can also include sending a message conforming to a money transfer messaging protocol, for example, where the message can comprise a subset of items of user identifying information, a subset of items of prospective fund transfer recipient identifying information, and/or the amount of the fund transfer request, as well as other information, data, commands, and so on, intended to effect the funds transfer, or which are related thereto.

In still other non-limiting examples of methods 600, the disclosed subject matter can facilitate installing the user interface component on the computing device associated with the user, wherein the user interface component can be configured to be added to an existing communications application of a communications service, as described above regarding FIGS. 1-3, for example.

In view of the methods described supra, systems and devices that can be implemented in accordance with the disclosed subject matter will be better appreciated with reference to the functional block diagrams of FIGS. 7-14. While, for purposes of simplicity of explanation, the functional block diagrams are shown and described as various assemblages of functional component blocks, it is to be understood and appreciated that such illustrations or corresponding descriptions are not limited by such functional block diagrams, as some implementations may occur in different configurations. Moreover, not all illustrated blocks may be required to implement the systems and devices described hereinafter.

Exemplary Systems and Apparatuses

Figure 7:
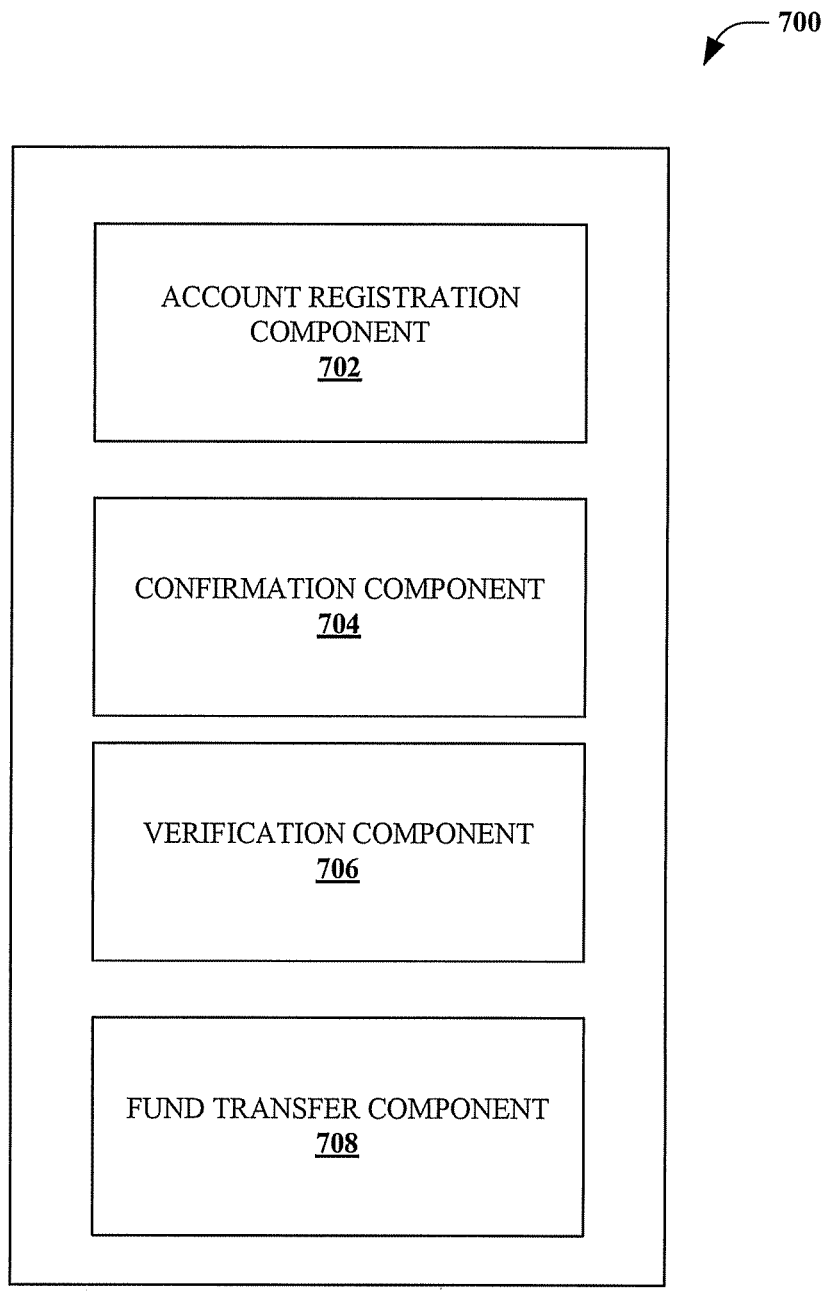
FIG. 7 illustrates an exemplary non-limiting transactional account systems suitable for performing various techniques of the disclosed subject matter.

FIG. 7 depicts a non-limiting block diagram of transactional account systems 700, according to various non-limiting aspects of the disclosed subject matter. As a non-limiting example, systems 700 can comprise exemplary account registration component 702, a confirmation component 704, a verification component 706, and a fund transfer component 708, as well as other ancillary and/or supporting components, and/or portions thereof, as described herein. For instance, as described herein, account registration component 702 can be configured to receive registration information (e.g., from a user 104) including various items of user identifying information. For instance, user identifying information can include one or more of a mobile device ID, a mobile phone number, a mobile account number, an instant message ID, an email address, an online messaging account ID, an online voice account ID, a money transfer service account ID, or a transactional account number, and so on, as well as other user or recipient identifying information as described herein, and/or has yet to be developed as a result of further developments in electronic communications.

Thus, account registration component 702 can be configured to associate the various items of user identifying information with a transactional account. According to various non-limiting embodiments the disclosed subject matter, each of items of user identifying information can enable a transferor of funds (e.g., entity A (user1 104)) to specify the user (e.g., entity B (user2 104)), an intended fund transfer recipient, an associated account, and so on, etc., in requesting a fund transfer to the user, for instance, as described above regarding FIG. 4-6. In a further example, as described herein, account registration component 702 can also be configured to present instructions to the user regarding creating the transactional account based on a prior fund transfer request associated with the user, as described above Thus, in various non-limiting implementations, account registration component 702, as described, can be employed in a variety of environments where it desired to allow designation of a deposit account associated with the user where (e.g., what account, what other arrangement necessary to collect the fund transfer, etc.) the fund transfer can be deposited.

In addition, as mentioned, account registration component 702 can be further configured to allow specification of transactional account limitations including a predetermined value (e.g., a fund transfer request amount or value, etc.), below which a user confirmation or a user verification (e.g., of the fund transfer request) is not desired by one or more of the user or the transferor of funds (e.g., entity A (user1 104)), whether to obscure a destination of the fund transfer, or a verification level for the fund transfer.

In further non-limiting implementations of system 700, confirmation component 704 can be configured to present a confirmation resource to the user on demand by the user, for instance, as further described herein (e.g., a confirmation resource such as registration page for a recipient, an accept transfer page for registered account owners or users, and so on, etc.). In other non-limiting implementations of system 700, confirmation component 704 can also be configured to present the confirmation resource and/or be configured to receive the demand by the user via a message conforming to a money transfer protocol, where the message can comprise a subset of items of user identifying information, a subset of items of transferor identifying information, and an amount of the fund transfer. Still other non-limiting implementations can comprise a verification component 706 and a fund transfer component 708, where the verification component 706 can be configured to receive a notification from the transferor of funds (e.g., entity A (user1 104)) (e.g., where the notification can specify a subset of the items of user identifying information and requests the fund transfer to the user, etc.), can be configured to receive a response from the user based on the confirmation resource, and can be configured to verify the response is received from the user specified by the subset of the items of user identifying information. In addition, the verification component 706 can be further configured to confirm the fund transfer request in the absence of receiving the response depending on the verification level. Moreover, fund transfer component 708 can be configured to complete the fund transfer based on the verification component verifying the response. Further discussion of the advantages and flexibility provided by the various non-limiting embodiments can be appreciated by review of the following descriptions. In addition, in further embodiments of verification component 706, the verification component 706 can be further configured to receive the notification via a message conforming to a money transfer protocol, where the message can comprise a subset of items of user identifying information, a subset of items of transferor identifying information, and an amount of the fund transfer.

Figure 8:
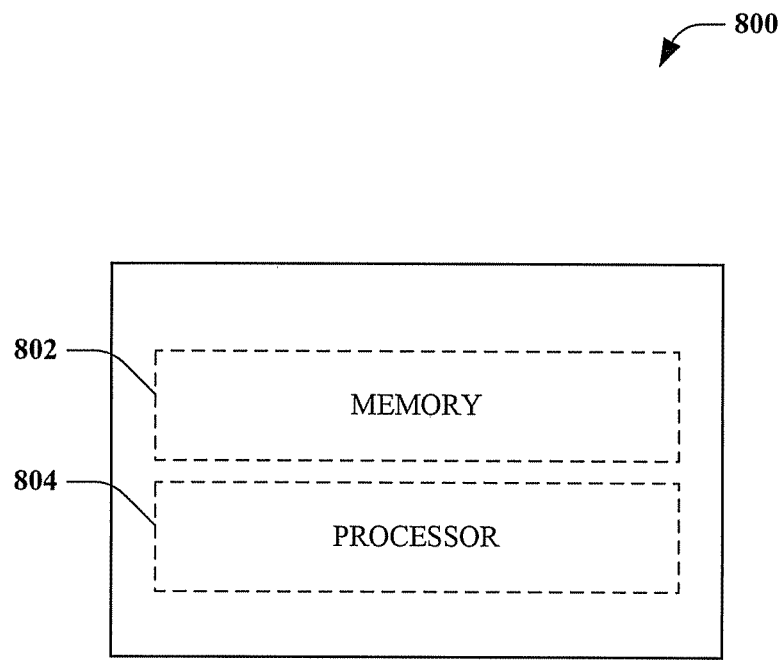
FIG. 8 illustrates exemplary non-limiting systems or apparatuses suitable for performing various techniques of the disclosed subject matter.

For example, FIG. 8 illustrates an exemplary non-limiting device, component, or system 800 suitable for performing various techniques of the disclosed subject matter. The device, component, or system 800 can be a stand-alone device, component, or system or portion thereof or such as a specially programmed computing device or a portion thereof (e.g., a memory retaining instructions for performing the techniques as described herein coupled to a processor). Device, component, or system 800 can include a memory 802 that retains various instructions with respect to send and/or receiving notifications regarding fund transfers, responding to the notifications, confirming fund transfer requests, initiating and completing fund transfers requests, sending and receiving messages according to various protocols including a money transfer protocol, performing analytical routines, and/or the like. For instance, device, component, or system 800 can include a memory 802 that retains instructions for receiving on a computing device (e.g., receiving on a computing device such as device 8000, etc.) associated with a user a notification from a transferor of funds (e.g., entity A (user1 104)) specifying user identifying information and specifying a fund transfer request has been made in favor of the user. As described above, according to various embodiments, each of the items user identifying information can be capable of solely specifying a user by the transferor of funds (e.g., entity A (user1 104)) in requesting a fund transfer to the user. The memory 802 can further retain instructions for responding to the notification by accessing a confirmation resource referenced in the notification. Additionally, memory 802 can retain instructions for confirming the fund transfer request at the confirmation resource from the computing device.

Memory 802 can further include instructions pertaining to specifying a mobile device ID, a mobile phone number, a mobile account number, an instant message ID, an email address, an online messaging account ID, an online voice account ID, a money transfer service account ID, or a transactional account number, among other possible or prospective user or recipient identifying information; to receiving, as part of the notification, a password generated to allow collection of the fund transfer; to obscuring or removing information regarding a source of the fund transfer from the user; to confirming the fund transfer request based on the subset of the items of user identifying information; to obscuring or removing information regarding a destination of the fund transfer from the transferor of funds (e.g., entity A (user1 104)); to abstaining from responding to the notification, accessing the confirmation resource, and/or confirming the fund transfer request for an amount of the fund transfer below a predetermined value; receiving the fund transfer according to a predetermined agreement; to, as part of accessing a confirmation resource, accessing a secure online resource configured to allow confirmation of the fund transfer, accessing instructions about how to register for a transactional account capable of accepting the fund transfer, or accessing instructions about how to collect the fund transfer in lieu of creating the transactional account; and to designating a deposit account associated with the user where the fund transfer can be deposited. The above example instructions and other suitable instructions can be retained within memory 802, and a processor 804 can be utilized in connection with executing the instructions.

In further non-limiting implementations, device, component, or system 800 can comprise processor 804, and/or computer readable instructions stored on a non-transitory computer readable storage medium (e.g., memory 802, a hard disk drive, and so on, etc.), the computer readable instructions, when executed by a computing device, e.g., processor 804, can cause the computing device perform operations, according to various aspects of the disclosed subject matter. For instance, as a non-limiting example, the computer readable instructions, when executed by a computing device, can cause the computing device to receive on the computing device associated with a user a notification from a transferor of funds (e.g., entity A (user1 104)) specifying items of user identifying information, wherein each of the items of identifying information can enable the transferor of funds (e.g., entity A (user1 104)) to specify the user (e.g., entity B (user2 104)), an intended fund transfer recipient, an associated account, and so on, etc., in requesting a fund transfer to the user, as described above, specifying a fund transfer request has been made in favor of the use, accepting user input to facilitate responding to the notification by accessing a confirmation resource referenced by the notification and/or confirming the fund transfer request at the confirmation resource from the computing device, and so on, etc., as described herein. In further non-limiting examples, the computer readable instructions, when executed by a computing device, can cause the computing device to receive a notification that conforms to a money transfer messaging protocol by including a subset of items of user identifying information, a subset of items of transferor identifying information, and an amount of the fund transfer and/or respond to the notification by sending a message conforming to the money transfer messaging protocol.

Accordingly, in further non-limiting embodiments, the disclosed subject matter provides a computer readable storage medium (e.g., a hard disk drive, optical drive, a memory, a flash memory, and so on, etc.) comprising computer executable instructions that, in response to execution, cause a computing device to perform operations as described herein. For instance, computer executable instructions can cause a computing device, to perform operations such as, associating a withdrawal account of a user with a user interface component of a computing device associated with the user based on user input, initiating a fund transfer request in the user interface component, based on the user selecting a prospective fund transfer recipient, accepting an amount of the fund transfer request entered by the user via the user interface component, and sending a fund transfer notification via the user interface component to the prospective fund transfer recipient, based on the user initiating the fund transfer request, as well as other operations as described above regarding FIGS. 1-6, etc., regarding, a device 106, or various components, or systems, and so on, as described above. In still other non-limiting examples, the computer readable instructions, when executed by a computing device, can cause the computing device to send a fund transfer notification that conforms to a money transfer messaging protocol, for instance, by including a subset of items of user identifying information, a subset of items of prospective fund transfer recipient identifying information, and/or an amount of the fund transfer, as well as other information, data, commands, and so on, intended to effect the funds transfer, or which are related thereto. In addition, in further non-limiting examples, the computer readable instructions, when executed by a computing device, can cause the computing device to omit, obscure, exclude, and/or remove information (e.g., such as withdrawal account information, and so on, etc.) that can reveal the withdrawal account of the user prior to the sending the fund transfer notification.

Figure 9:
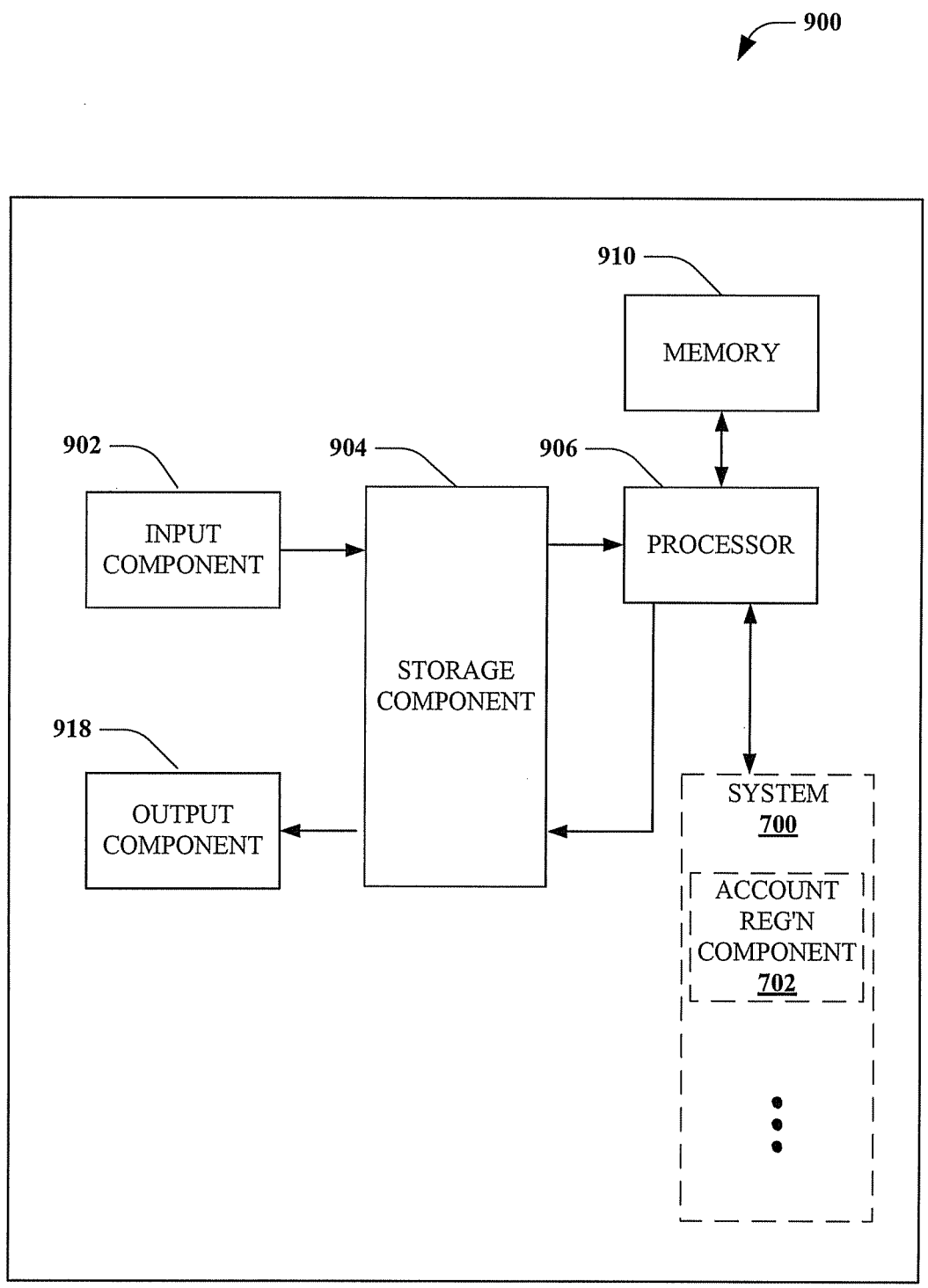
FIG. 9 illustrates non-limiting systems or apparatuses that can be utilized in connection with electronic payment systems and supporting methods and devices as described herein.

FIG. 9 illustrates non-limiting systems or apparatuses 900 that can be utilized in connection with electronic payment systems and supporting methods and devices as described herein. As a non-limiting example, systems or apparatuses 900 can comprise an input component 902 that can receive data, signals, information, feedback, and so on to facilitate generating and/or initiating a fund transfer request, registering a transactional account, preparing, sending, and or receiving fund transfer notifications, confirming fund transfer requests, verifying fund transfer requests, and so on, and can perform typical actions thereon (e.g., transmits information to storage component 904 or other components, portions thereof, and so on, etc.) for the received data, signals, information, verification or confirmation, etc. A storage component 904 can store the received data, signals, information (e.g., such as described above regarding FIGS. 1-6, etc.) for later processing or can provide it to other components, or a processor 906, via memory 910 over a suitable communications bus or otherwise, or to the output component 918.

Processor 906 can be a processor dedicated to analyzing information received by input component 902 and/or generating information for transmission by an output component 918. Processor 906 can be a processor that controls one or more portions of systems or apparatuses 900, and/or a processor that can analyze information received by input component 902, can generate information for transmission by output component 918, and can perform various algorithms or operations associated with electronic payments, fund transfer requests, or as further described herein. In addition, systems or apparatuses 900 can include further various components, as described above, for example, regarding FIGS. 7-8, and that can perform various techniques as described herein, in addition to the various other functions required by other components as described above.

As a non-limiting example of FIG. 9 as a system 900, while system 700 is shown external to the processor 906 and memory 910, it is to be appreciated that system 700 can include code or instructions stored in storage component 904 and subsequently retained in memory 910 for execution by processor 906. In addition, system 700 can utilize artificial intelligence based methods in connection with performing inference and/or probabilistic determinations and/or statistical-based determinations in connection with techniques described herein.

Systems or apparatuses 900 can additionally comprise memory 910 that is operatively coupled to processor 906 and that stores information such as described above, user or recipient identifying information, and the like, wherein such information can be employed in connection with implementing the electronic payment systems, methods, and so on as described herein. Memory 910 can additionally store protocols associated with generating lookup tables, etc., such that systems or apparatuses 900 can employ stored protocols and/or algorithms further to the performance of various algorithms and/or portions thereof as described herein.

It will be appreciated that storage component 904 and memory 906, or any combination thereof as described herein, can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synch link DRAM (SLDRAM), and direct Rambus RAM (DRRAM). The memory 910 is intended to comprise, without being limited to, these and any other suitable types of memory, including processor registers and the like. In addition, by way of illustration and not limitation, storage component 904 can include conventional storage media as in known in the art (e.g., hard disk drive).

Accordingly, in further non-limiting implementations, exemplary systems or apparatuses 900 can comprise means for registering a transactional account for a user, wherein the registering includes associating a plurality of items of user identifying information with the transactional account. For instance, regarding systems or apparatuses 900, as further described herein, each of the items of user or recipient identifying information can enable a transferor of funds (e.g., entity A (user1 104)) to specify the user (e.g., entity B (user2 104)), an intended fund transfer recipient, an associated account, and so on, etc., in requesting a fund transfer to the user. Furthermore, systems or apparatuses 900 can comprise a means for receiving a notification from the transferor of funds (e.g., entity A (user1 104)) specifying a subset of the items of user identifying information and requesting the fund transfer, for example, as described above regarding FIG. 1-7, 14-16, etc. In addition, exemplary systems or apparatuses 900 can further comprise means for completing the fund transfer for the user based on the subset of items of user identifying information associated with the transactional account, for example, as described above regarding FIGS. 1-7. It can be understood that in various non-limiting implementations of FIG. 9 as an apparatus 900, various aspects of the disclosed subject matter can be performed by a device 106 such as a mobile device. That is, various non-limiting aspects of the disclosed subject matter can be performed by a device 106 having portions of FIG. 9 (e.g., input component 902, storage component 904, processor 906, memory 910, output component 918, etc.).

Thus, in still other non-limiting implementations, exemplary systems or apparatuses 900, can also include device 106, such as a mobile device, as described above regarding FIG. 1-5, 8, etc., for instance, and as further describe below regarding FIG. 13-16. As a non-limiting example, device 106 can comprise a notification component (not shown) configured to receive a notification from a transferor of funds specifying a subset of items of user identifying information, for instance, where each item of user identifying information enables the transferor of funds to specify a user of the mobile device in requesting a fund transfer to the user, and specifying a fund transfer request has been made in favor of the user, for instance, as further described herein regarding FIG. 10, etc. In still other non-limiting implementations, a notification component of device 106 can be further configured to receive the notification via a message conforming to a money transfer protocol, for example, where the message can comprise a subset of items of user identifying information, a subset of items of transferor identifying information, and/or an amount of the fund transfer, as further described above. Moreover, device 106 can further comprise an input component (e.g., input component 902, etc.) configured to facilitate responding to the notification by accessing a confirmation resource referenced by the notification and to facilitate confirming the fund transfer request at the confirmation resource from the computing device (e.g., device 106, etc.).

In a further non-limiting example, device 106 can comprise means for receiving on the computing device associated with a user (e.g., device 106, etc.) a notification from a transferor of funds (e.g., entity A (user1 104)) specifying user (or recipient) identifying information and requesting a fund transfer to the user and specifying a fund transfer request has been made in favor of the user. As further described above, each item of user or recipient identifying information can enable the transferor of funds (e.g., entity A (user1 104)) to specify the user (e.g., entity B (user2 104)), an intended fund transfer recipient, an associated account, and so on, etc., in requesting a fund transfer to the user, according to various non-limiting embodiments. In still other non-limiting embodiments of a device 106, such as a mobile device, the means for receiving can be further configured to receive a message conforming to a money transfer protocol, as described herein.

In addition, device 106 can further comprise means for responding to the notification by accessing a confirmation resource referenced in the notification, as further described above, for example, regarding FIGS. 1-6, etc. As further described above, the means for responding to the notification can be further configured to receive a message conforming to a money transfer protocol. In a further non-limiting example, the device 106 can also include means for confirming the fund transfer request at the confirmation resource from the computing device (e.g., device 106), as further described herein. Moreover, the means for confirming the funds transfer request of device 106 can be further configured to receive a message conforming to a money transfer protocol. As previously described, message conforming to a money transfer protocol can comprise a subset of items of user identifying information, a subset of items of transferor identifying information, and/or an amount of the fund transfer, as well as other information, data, commands, and so on, intended to effect the funds transfer, or which are related thereto, As can be understood, device 106 can be further configured to perform various aspects as described herein, regarding FIGS. 1-5, 8, etc. as well as additional and/or ancillary aspects as further described below regarding FIGS. 13-16.

Figure 10:
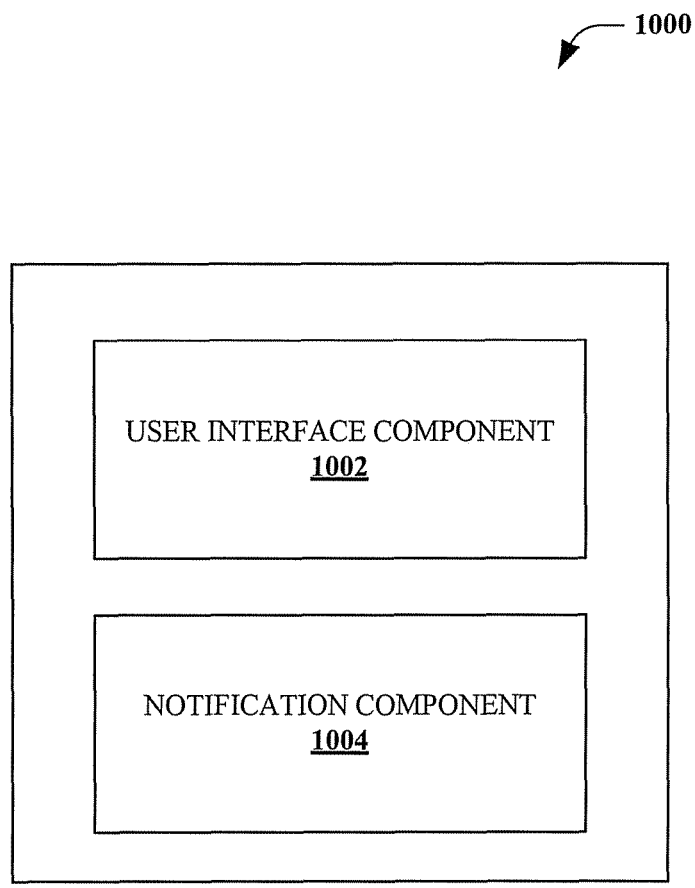
FIGS. 10-12 demonstrate exemplary block diagrams of various non-limiting embodiments, in accordance with aspects of the disclosed subject matter.

According to still other non-limiting implementations, various aspects of the disclosed subject matter can be performed by a device 106 such as a mobile device, as described herein, for example, regarding FIGS. 6, 8-13, etc. That is, various non-limiting aspects of the disclosed subject matter can be performed by a device 106 having portions of FIG. 9 (e.g., input component 902, storage component 904, processor 906, memory 910, output component 918, etc.) and/or components of FIG. 10. For instance, FIG. 10 depicts exemplary non-limiting fund transfer systems or apparatuses 1000 suitable for performing various techniques of the disclosed subject matter. Thus, in still other non-limiting implementations, exemplary systems or apparatuses 1000 can also include device 106, such as a mobile device, or portions thereof, as described above regarding FIG. 1-8, etc., for instance, and as further describe below regarding FIG. 13-16.

Accordingly, in various non-limiting embodiments of systems or apparatuses 1000, exemplary fund transfer systems can comprise a user interface component 1002 configured to allow specification of a recipient of a fund transfer. As a non-limiting example, in an aspect, the specification of a recipient of a fund transfer can further comprise selection of the prospective fund transfer recipient from a mobile device contact list, a buddy list, an electronic phone book, an electronic address book, a follower list, or a friend list, and so on. For instance, in a further non-limiting aspect, specification of a recipient of a fund transfer can include specification of identifying information for the prospective fund transfer recipient including a mobile device ID, a mobile phone number, a mobile account number, an instant message ID, an email address, an online messaging account ID, an online voice account ID, a money transfer service account ID, or a transactional account number, as described above.

In yet another example, the user interface component 1002 can also be configured to be integrated into an existing communications application for a communications service, as further described above, and as depicted in FIG. 11. In addition, the user interface component 1002 can be further configured to allow the user to enter an amount of the fund transfer request as further described herein, and as depicted in FIG. 12. In yet other exemplary embodiments of the disclosed subject matter, non-limiting fund transfer systems can also comprise user interface component 1002 configured to allow the user to associate a withdrawal account of the user with the user interface component including affiliation of a transactional account having predetermined limitations. For instance, predetermined limitations can include a predetermined value, below which, confirmation of the prospective fund transfer recipient is not required, whether to obscure the fact that the withdrawal account is a source of the fund transfer request, and/or a verification level for the fund transfer request, and so on, as well as other limitations or restrictions as described herein.

In still other exemplary embodiments of embodiments of systems or apparatuses 1000, the user interface component 1002, the existing communications application, and/or the communications service can be further configured to transfer a message that conforms to a money transfer messaging protocol, as further described above. For instance, in various embodiments, a message that conforms to a money transfer messaging protocol, as further described above can comprise a subset of items of identifying information for the prospective fund transfer recipient, a subset of items of user identifying information, and/or an amount of the fund transfer, as well as other information, data, commands, and so on, intended to effect the funds transfer, or which are related thereto.

In various non-limiting embodiments, user interface component 1002 can be installable as an add-on or plugin to an existing communications application for the communications service, as well as can be provided as native support or functionality in the communications application.

In still other non-limiting implementations of systems apparatuses 1000, exemplary fund transfer systems can also include a notification component 1004 configured to transmit a notification from a transferor of funds (e.g., entity A (user1 104)) specifying the recipient of the fund transfer, and specifying a fund transfer request has been made in favor of the recipient of the fund transfer via the communications service. In a further non-limiting example of non-limiting fund transfer systems, notification component 1004 can be further configured to send a reference to a confirmation resource available to the prospective fund transfer recipient to confirm the fund transfer request, such as described above.

As a non-limiting example, device 106 can comprise means for associating a withdrawal account of a user with a user interface of a computing device (e.g., device 106) associated with the user, as further described above, for example, regarding FIGS. 1-10, etc. In a further non-limiting example, the device 106 can also include means for initiating a fund transfer request in the user interface, by selecting a prospective fund transfer recipient, as further described herein. As can be understood, device 106 can further comprise means for entering an amount of the fund transfer request via the user interface and/or sending a fund transfer notification via the user interface to the prospective fund transfer recipient, as well as can be further configured to perform various aspects as described herein, regarding FIGS. 1-10, etc. as well as additional and/or ancillary aspects as further described below regarding FIGS. 11, 12, and 13-16. Moreover, as further described above regarding a money transfer protocol, the means for sending of device 106 can be further configured to send a message conforming to a money transfer protocol, where the message comprises a subset of items of user identifying information, a subset of items of prospective fund transfer recipient identifying information, and an amount of the fund transfer request, as well as other information, data, commands, and so on, intended to effect the funds transfer, or which are related thereto in addition to omitting, obscuring, excluding, or removing information that can reveal the withdrawal account of the user prior to the sending the fund transfer notification.

Figure 11:
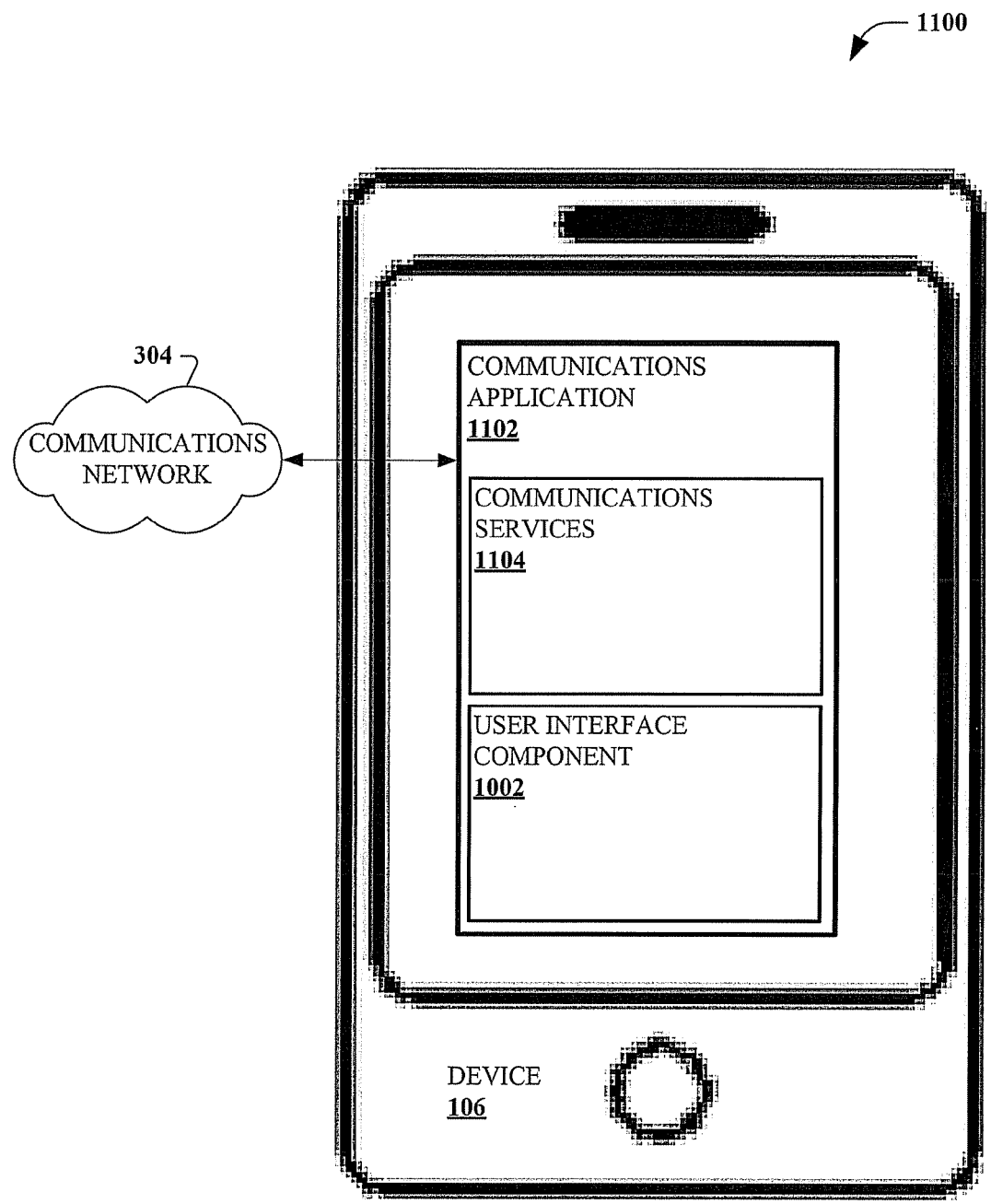
Figure 12:
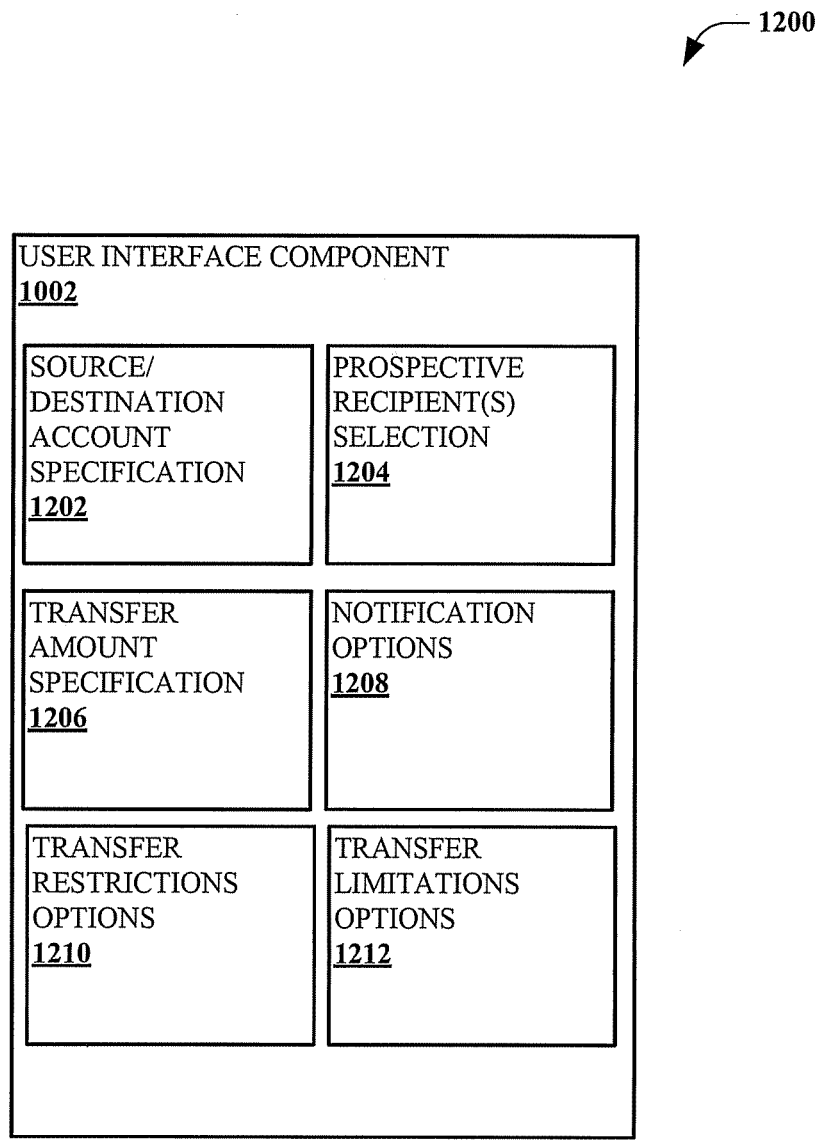

For instance, FIG. 11 depicts an exemplary device 106 executing a communications application 1102 operating in conjunction with communication services 1104, and in communication with communications network 304, as previously described. Thus, it can be seen in FIG. 11 that user interface component 1002, when added on or plugged into communications application 1102 (or when functionality of user interface component 1002 is provided via communications application 1102, natively, etc.), can facilitate various aspects as described herein. For example, as can be seen in the functional block diagram of FIG. 12, user interface component 1002 can comprise various user interface subcomponents, and/or portions thereof, including without limitation source/destination account specification subcomponent 1202, prospective recipient(s) selection subcomponent 1204, transfer amount specification subcomponent 1206, notification options subcomponent 1208, transfer restrictions options subcomponent 1210, and/or transfer limitations options subcomponent 1212, and/or any combination, as well as further or lesser functionality as required by the context. The various components of components or portions thereof can be understood to facilitate respective functions and/or features as indicated and as further described above, for example, regarding FIGS. 1-7, etc., and as further described below regarding FIGS. 14-16.

Exemplary Mobile Device

Figure 13:
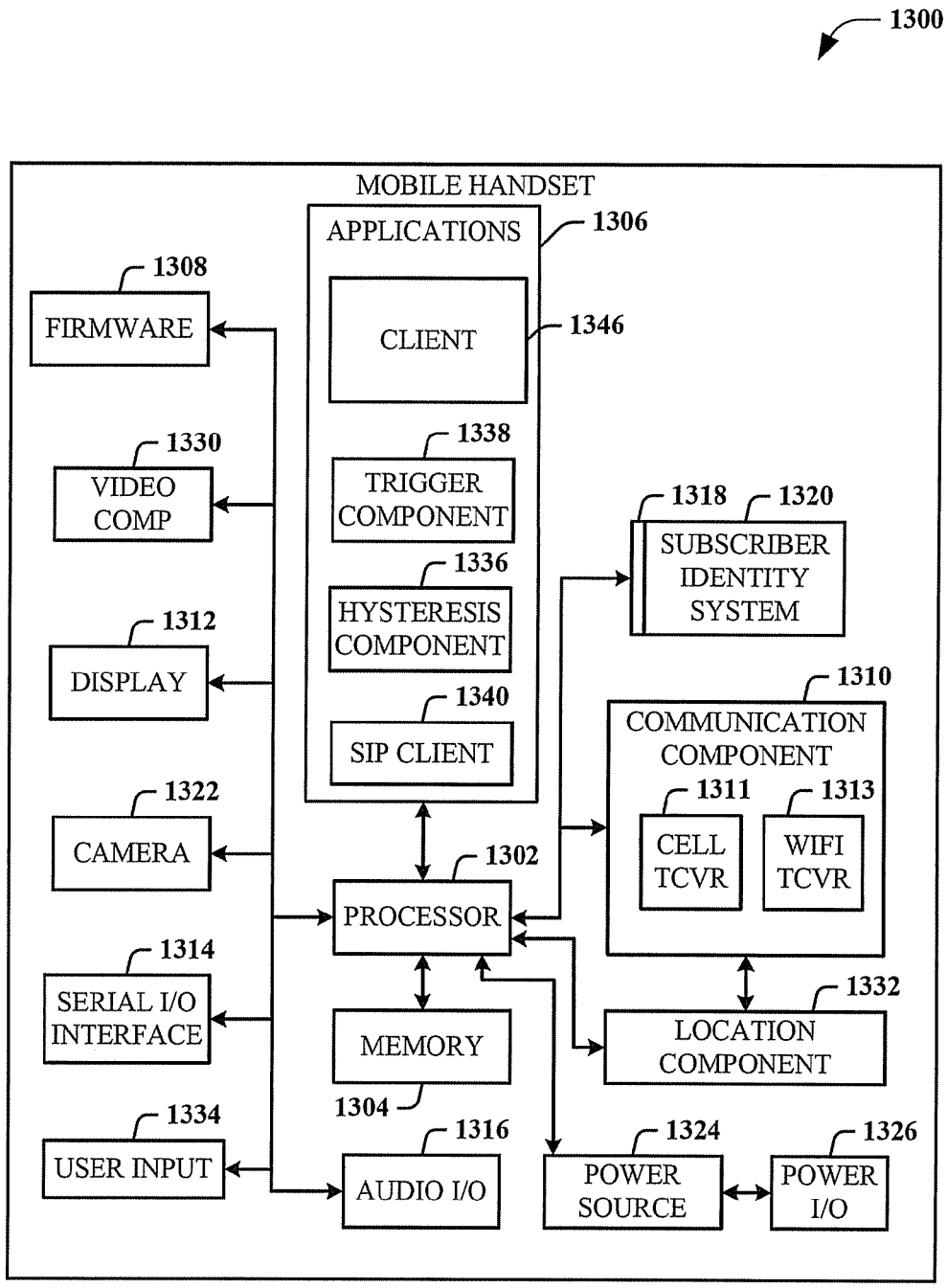
FIG. 13 illustrates a schematic diagram of an exemplary mobile device (e.g., a mobile handset) that can facilitate various non-limiting aspects of the disclosed subject matter in accordance with the embodiments described herein.

FIG. 13 depicts a schematic diagram of an exemplary mobile device 1300 (e.g., a mobile handset) that can facilitate various non-limiting aspects of the disclosed subject matter in accordance with the embodiments described herein. Although mobile handset 1300 is illustrated herein, it will be understood that other devices can be a mobile device, as described above regarding FIG. 3, for instance, and that the mobile handset 1300 is merely illustrated to provide context for the embodiments of the subject matter described herein. The following discussion is intended to provide a brief, general description of an example of a suitable environment 1300 in which the various embodiments can be implemented. While the description includes a general context of computer-executable instructions embodied on a computer readable storage medium, those skilled in the art will recognize that the subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multi-processor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can comprise any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable communications media as distinguishable from computer-readable storage media.

The handset 1300 can include a processor 1302 for controlling and processing all onboard operations and functions. A memory 1304 interfaces to the processor 1302 for storage of data and one or more applications 1306 (e.g., communications applications such as IM, SMS, adaptable to electronic payments as described herein and/or other application specifically targeted to electronic payments for transfers, such as MTMS, etc.). Other applications can support operation of communications and/or financial communications protocols. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wireless Fidelity (WiFi™), Worldwide Interoperability for Microwave Access (WiMax®)) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., Universal Serial Bus (USB), and/or Institute of Electrical and Electronics Engineers (IEEE) 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process Internet Protocol (IP) data traffic through the communication component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or a decoded format.

A video processing component 1322 (e.g., a camera) can be provided for decoding encoded multimedia content. The video processing component 1322 can aid in facilitating the generation and/or sharing of video. The handset 1300 also includes a power source 1324 in the form of batteries and/or an alternating current (AC) power subsystem, which power source 1324 can interface to an external power system or charging equipment (not shown) by a power input/output (I/O) component 1326.

The handset 1300 can also include a video component 1330 for processing video content received and, for recording and transmitting video content. For example, the video component 1330 can facilitate the generation, editing and sharing of video. A location-tracking component 1332 facilitates geographically locating the handset 1300. A user input component 1334 facilitates the user inputting data and/or making selections as previously described. The user input component 1334 can also facilitate selecting perspective recipients for fund transfer, entering amounts requested to be transferred, indicating account restrictions and/or limitations, as well as composing messages and other user input tasks as required by the context. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with an access point. A software trigger component 1338 can be provided that facilitates triggering of the hysteresis component 1338 when a WiFi™ transceiver 1313 detects the beacon of the access point. A SIP client 1340 enables the handset 1300 to support SIP protocols and register the subscriber with the SIP registrar server. The applications 1306 can also include a communications application or client 1346 that, among other possibilities, can be target for transfer money plugin or user interface component functionality as described above.

The handset 1300, as indicated above related to the communications component 1310, includes an indoor network radio transceiver 1313 (e.g., WiFi transceiver). This function supports the indoor radio link, such as IEEE 802.11, for the dual-mode Global System for Mobile Communications (GSM) handset 1300. The handset 1300 can accommodate at least satellite radio services through a handset that can combine wireless voice and digital radio chipsets into a single handheld device.

It can be understood that while a brief overview of exemplary systems, methods, scenarios, and/or devices has been provided, the disclosed subject matter is not so limited. Thus, it can be further understood that various modifications, alterations, addition, and/or deletions can be made without departing from the scope of the embodiments as described herein. Accordingly, similar non-limiting implementations can be used or modifications and additions can be made to the described embodiments for performing the same or equivalent function of the corresponding embodiments without deviating therefrom.

Exemplary Computer Networks and Environments

One of ordinary skill in the art can appreciate that the disclosed subject matter can be implemented in connection with any computer or other client or server device, which can be deployed as part of a communications system, a computer network, or in a distributed computing environment, connected to any kind of data store. In this regard, the disclosed subject matter pertains to any computer system or environment having any number of memory or storage units, and any number of applications and processes occurring across any number of storage units or volumes, which may be used in connection with communication systems using the scheduling techniques, systems, and methods in accordance with the disclosed subject matter. The disclosed subject matter may apply to an environment with server computers and client computers deployed in a network environment or a distributed computing environment, having remote or local storage. The disclosed subject matter may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage, and disk storage for objects, such as files. Distributed computing takes advantage of network connectivity, allowing clients to leverage their collective power to benefit the entire enterprise. In this regard, a variety of devices may have applications, objects, or resources that may implicate the communication systems using the scheduling techniques, systems, and methods of the disclosed subject matter.

Figure 14:
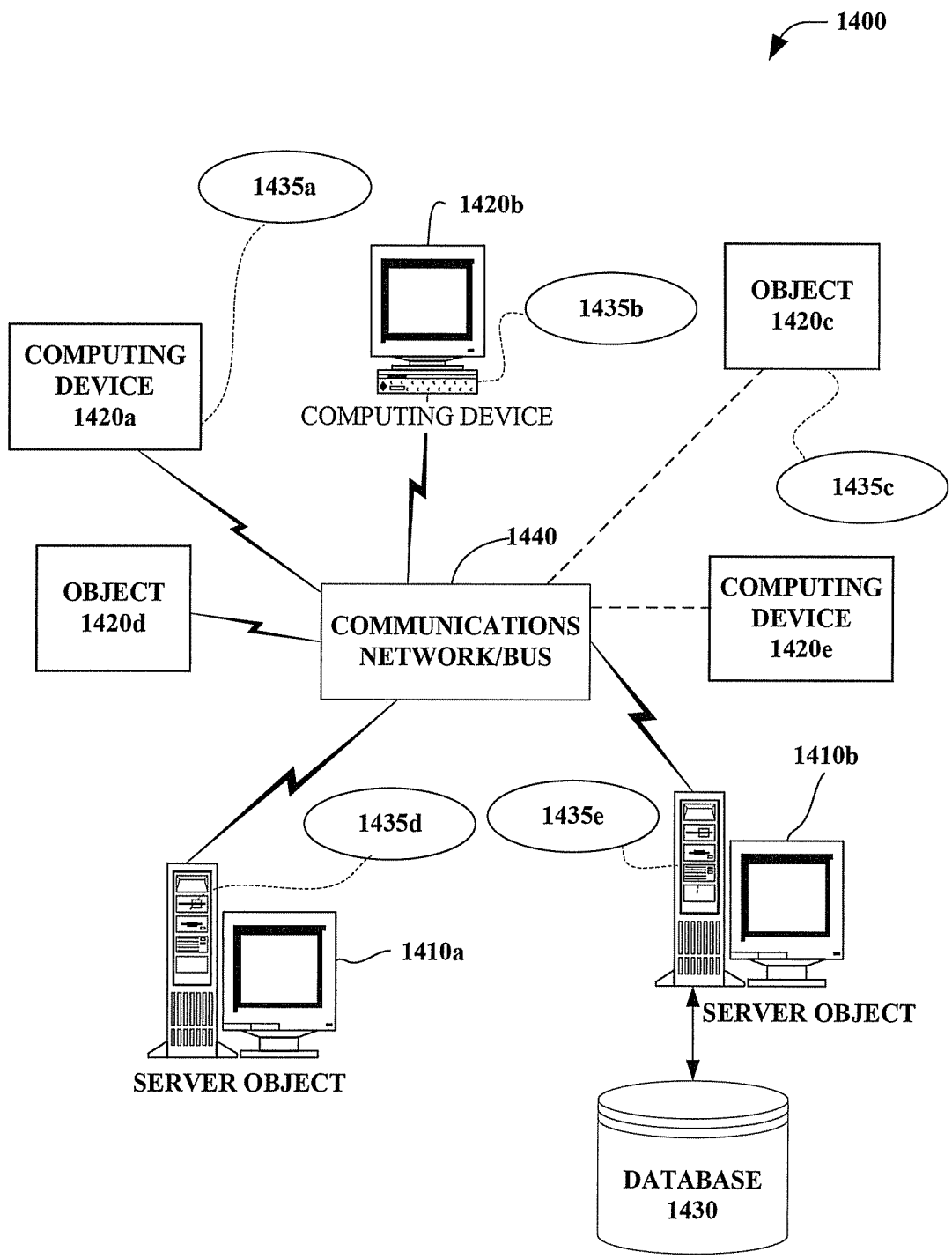
FIG. 14 is a block diagram representing an exemplary non-limiting networked environment in which the disclosed subject matter may be implemented.

FIG. 14 provides a schematic diagram of an exemplary networked or distributed computing environment. The distributed computing environment comprises computing objects 1410a, 1410b, etc. and computing objects or devices 1420a, 1420b, 1420c, 1420d, 1420e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 1440. This network may itself comprise other computing objects and computing devices that provide services to the system of FIG. 14, and may itself represent multiple interconnected networks. In accordance with an aspect of the disclosed subject matter, each object 1410a, 1410b, etc. or 1420a, 1420b, 1420c, 1420d, 1420e, etc. may contain an application that might make use of an API, or other object, software, firmware and/or hardware, suitable for use with the design framework in accordance with the disclosed subject matter.

It can also be appreciated that an object, such as 1420c, may be hosted on another computing device 1410a, 1410b, etc. or 1420a, 1420b, 1420c, 1420d, 1420e, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There is a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for communicating information used in the communication systems using the scheduling techniques, systems, and methods according to the disclosed subject matter.

The Internet commonly refers to the collection of networks and gateways that utilize the Transmission Control Protocol/Internet Protocol (TCP/IP) suite of protocols, which are well known in the art of computer networking The Internet can be described as a system of geographically distributed remote computer networks interconnected by computers executing networking protocols that allow users to interact and share information over network(s). Because of such widespread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, e.g., roughly a set of instructions or tasks, that requests a service provided by another program. The client process utilizes the requested service without having to "know" any working details about the other program or the service itself. In client/server architecture, particularly a networked system, a client is usually a computer that accesses shared network resources provided by another computer, e.g., a server. In the illustration of FIG. 14, as an example, computers 1420a, 1420b, 1420c, 1420d, 1420e, etc. can be thought of as clients and computers 1410a, 1410b, etc. can be thought of as servers where servers 1410a, 1410b, etc. maintain the data that is then replicated to client computers 1420a, 1420b, 1420c, 1420d, 1420e, etc., although any computer can be considered a client, a server, or both, depending on the circumstances. Any of these computing devices may be processing data or requesting services or tasks that may use or implicate the communication systems using the scheduling techniques, systems, and methods in accordance with the disclosed subject matter.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to communication (wired or wirelessly) using the scheduling techniques, systems, and methods of the disclosed subject matter may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 14 illustrates an exemplary networked or distributed environment, with server(s) in communication with client computer (s) via a network/bus, in which the disclosed subject matter may be employed. In more detail, a number of servers 1410a, 1410b, etc. are interconnected via a communications network/bus 1440, which may be a LAN, WAN, intranet, GSM network, the Internet, etc., with a number of client or remote computing devices 1420a, 1420b, 1420c, 1420d, 1420e, etc., such as a portable computer, handheld computer, thin client, networked appliance, or other device, such as a VCR, TV, oven, light, heater and the like in accordance with the disclosed subject matter. It is thus contemplated that the disclosed subject matter may apply to any computing device in connection with which it is desirable to communicate data over a network.

In a network environment in which the communications network/bus 1440 is the Internet, for example, the servers 1410a, 1410b, etc. can be Web servers with which the clients 1420a, 1420b, 1420c, 1420d, 1420e, etc. communicate via any of a number of known protocols such as HTTP. Servers 1410a, 1410b, etc. may also serve as clients 1420a, 1420b, 1420c, 1420d, 1420e, etc., as may be characteristic of a distributed computing environment.

As mentioned, communications to or from the systems incorporating the scheduling techniques, systems, and methods of the disclosed subject matter may ultimately pass through various media, either wired or wireless, or a combination, where appropriate. Client devices 1420a, 1420b, 1420c, 1420d, 1420e, etc. may or may not communicate via communications network/bus 14, and may have independent communications associated therewith. For example, in the case of a TV or VCR, there may or may not be a networked aspect to the control thereof. Each client computer 1420a, 1420b, 1420c, 1420d, 1420e, etc. and server computer 1410a, 1410b, etc. may be equipped with various application program modules or objects 1435a, 1435b, 1435c, etc. and with connections or access to various types of storage elements or objects, across which files or data streams may be stored or to which portion(s) of files or data streams may be downloaded, transmitted or migrated. Any one or more of computers 1410a, 1410b, 1420a, 1420b, 1420c, 1420d, 1420e, etc. may be responsible for the maintenance and updating of a database 1430 or other storage element, such as a database or memory 1430 for storing data processed or saved based on communications made according to the disclosed subject matter. Thus, the disclosed subject matter can be utilized in a computer network environment having client computers 1420a, 1420b, 1420c, 1420d, 1420e, etc. that can access and interact with a computer network/bus 1440 and server computers 1410a, 1410b, etc. that may interact with client computers 1420a, 1420b, 1420c, 1420d, 1420e, etc. and other like devices, and databases 1430.

Exemplary Computing Device

Figure 15:
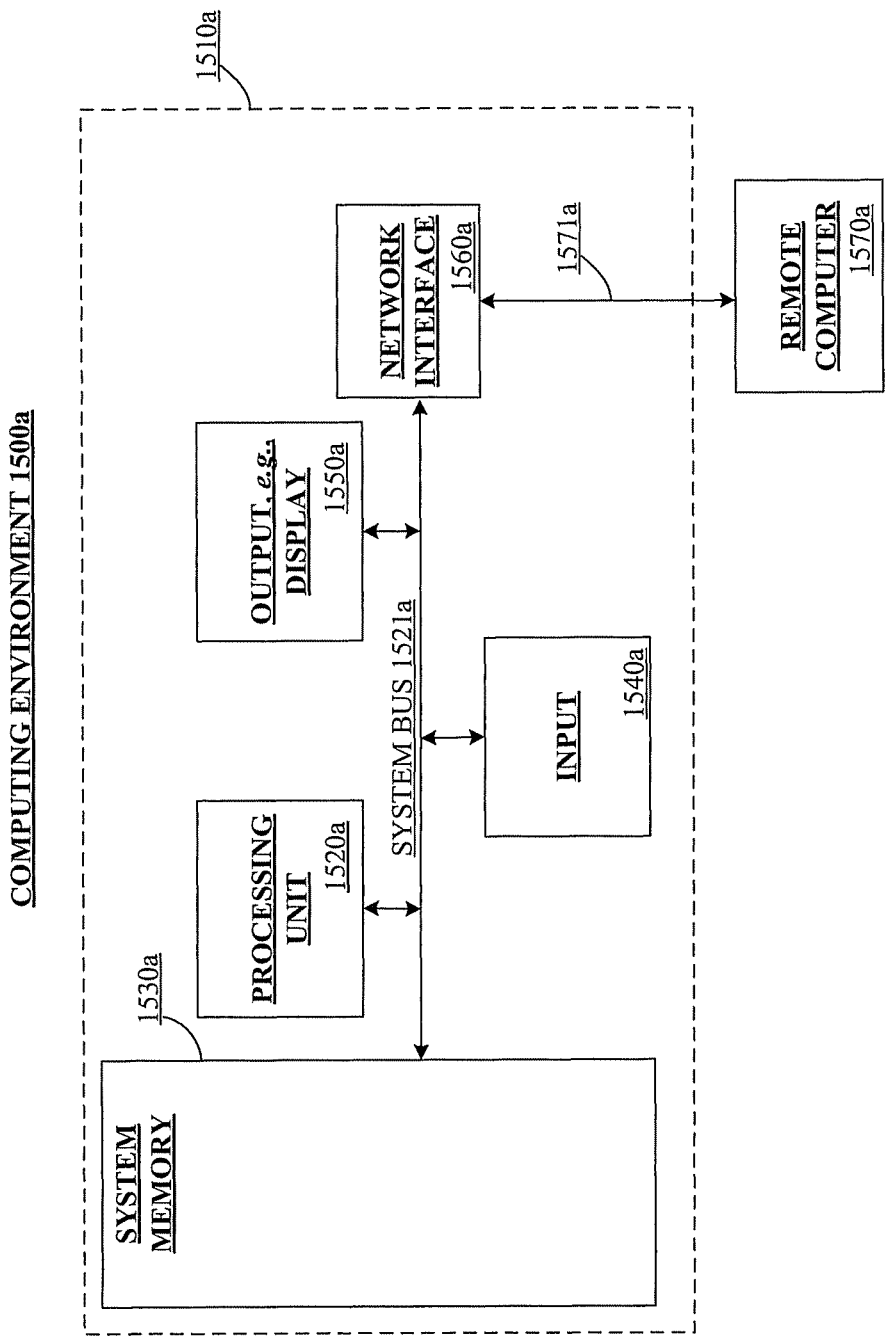
FIG. 15 is a block diagram representing an exemplary non-limiting computing system or operating environment in which the disclosed subject matter may be implemented.

As mentioned, the disclosed subject matter applies to any device wherein it may be desirable to communicate data, e.g., to or from a mobile device. It should be understood, therefore, that handheld, portable and other computing devices and computing objects of all kinds are contemplated for use in connection with the disclosed subject matter, e.g., anywhere that a device may communicate data or otherwise receive, process or store data. Accordingly, the below general purpose remote computer described below in FIG. 15 is but one example, and the disclosed subject matter may be implemented with any client having network/bus interoperability and interaction. Thus, the disclosed subject matter may be implemented in an environment of networked hosted services in which very little or minimal client resources are implicated, e.g., a networked environment in which the client device serves merely as an interface to the network/bus, such as an object placed in an appliance.

Although not required, the some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules, being executed by one or more computers, such as client workstations, servers or other devices. Those skilled in the art will appreciate that the disclosed subject matter may be practiced with other computer system configurations and protocols.

FIG. 15 thus illustrates an example of a suitable computing system environment 1500a in which some aspects of the disclosed subject matter may be implemented, although as made clear above, the computing system environment 1500a is only one example of a suitable computing environment for a media device and is not intended to suggest any limitation as to the scope of use or functionality of the disclosed subject matter. Neither should the computing environment 1500a be interpreted as having any dependency or requirement relating to any one or combination of components illustrated in the exemplary operating environment 1500a.

With reference to FIG. 15, an exemplary remote device for implementing the disclosed subject matter includes a general-purpose computing device in the form of a computer 1510a. Components of computer 1510a may include, but are not limited to, a processing unit 1520a, a system memory 1530a, and a system bus 1521a that couples various system components including the system memory to the processing unit 1520a. The system bus 1521a may be any of several types of bus structures including a memory bus or memory controller, a peripheral bus, and a local bus using any of a variety of bus architectures.

Computer 1510a typically includes a variety of computer readable media. Computer readable media can be any available media that can be accessed by computer 1510a. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1510a. Communication media typically embodies computer readable instructions, data structures, program modules, or other data in a modulated data signal such as a carrier wave or other transport mechanism and includes any information delivery media.

The system memory 1530a may include computer storage media in the form of volatile and/or nonvolatile memory such as read only memory (ROM) and/or random access memory (RAM). A basic input/output system (BIOS), containing the basic routines that help to transfer information between elements within computer 1510a, such as during start-up, may be stored in memory 1530a. Memory 1530a typically also contains data and/or program modules that are immediately accessible to and/or presently being operated on by processing unit 1520a. By way of example, and not limitation, memory 1530a may also include an operating system, application programs, other program modules, and program data.

The computer 1510a may also include other removable/non-removable, volatile/nonvolatile computer storage media. For example, computer 1510a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1521a through a non-removable memory interface such as an interface, and a magnetic disk drive or optical disk drive is typically connected to the system bus 1521a by a removable memory interface, such as an interface.

A user may enter commands and information into the computer 1510a through input devices such as a keyboard and pointing device, commonly referred to as a mouse, trackball, or touch pad. Other input devices may include a microphone, joystick, game pad, satellite dish, scanner, wireless device keypad, voice commands, or the like. These and other input devices are often connected to the processing unit 1520a through user input 1540a and associated interface(s) that are coupled to the system bus 1521a, but may be connected by other interface and bus structures, such as a parallel port, game port or a universal serial bus (USB). A graphics subsystem may also be connected to the system bus 1521a. A monitor or other type of display device is also connected to the system bus 1521a via an interface, such as output interface 1550a, which may in turn communicate with video memory. In addition to a monitor, computers may also include other peripheral output devices such as speakers and a printer, which may be connected through output interface 1550a.

The computer 1510a may operate in a networked or distributed environment using logical connections to one or more other remote computers, such as remote computer 1570a, which may in turn have media capabilities different from device 1510a. The remote computer 1570a may be a personal computer, a server, a router, a network PC, a peer device, personal digital assistant (PDA), cell phone, handheld computing device, or other common network node, or any other remote media consumption or transmission device, and may include any or all of the elements described above relative to the computer 1510a. The logical connections depicted in FIG. 15 include a network 1571a, such local area network (LAN) or a wide area network (WAN), but may also include other networks/buses, either wired or wireless. Such networking environments are commonplace in homes, offices, enterprise-wide computer networks, intranets and the Internet.

When used in a LAN networking environment, the computer 1510a is connected to the LAN 1571a through a network interface or adapter. When used in a WAN networking environment, the computer 1510a typically includes a communications component, such as a modem, or other means for establishing communications over the WAN, such as the Internet. A communications component, such as a modem, which may be internal or external, may be connected to the system bus 1521a via the user input interface of input 1540a, or other appropriate mechanism. In a networked environment, program modules depicted relative to the computer 1510a, or portions thereof, may be stored in a remote memory storage device. It will be appreciated that the network connections shown and described are exemplary and other means of establishing a communications link between the computers may be used.

While the disclosed subject matter has been described in connection with the preferred embodiments of the various figures, it is to be understood that other similar embodiments may be used or modifications and additions may be made to the described embodiment for performing the same function of the disclosed subject matter without deviating therefrom.

For example, one skilled in the art will recognize that the disclosed subject matter as described in the present application applies to communication systems using the disclosed scheduling techniques, systems, and methods and may be applied to any number of devices connected via a communications network and interacting across the network, either wired, wirelessly, or a combination thereof.

Accordingly, while words such as transmitted and received are used in reference to the described communications processes, it should be understood that such transmitting and receiving is not limited to digital communications systems, but could encompass any manner of sending and receiving data suitable for implementation of the described scheduling techniques. As a result, the disclosed subject matter should not be limited to any single embodiment, but rather should be construed in breadth and scope in accordance with the appended claims.

Exemplary Communications Networks and Environments

The above-described communication systems using the scheduling techniques, systems, and methods may be applied to any network, however, the following description sets forth some exemplary telephony radio networks and non-limiting operating environments for communications made incident to the communication systems using the scheduling techniques, systems, and methods of the disclosed subject matter. The below-described operating environments should be considered non-exhaustive, however, and thus, the below-described network architecture merely shows one network architecture into which the disclosed subject matter may be incorporated. One can appreciate, however, that the disclosed subject matter may be incorporated into any now existing or future alternative architecture for communication networks as well.

The global system for mobile communication ("GSM") is one of the most widely utilized wireless access systems in today's fast growing communication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the scheduling techniques, systems, and methods of the disclosed subject matter may be applied independently of the method of data transport, and does not depend on any particular network architecture, or underlying protocols.

Figure 16:
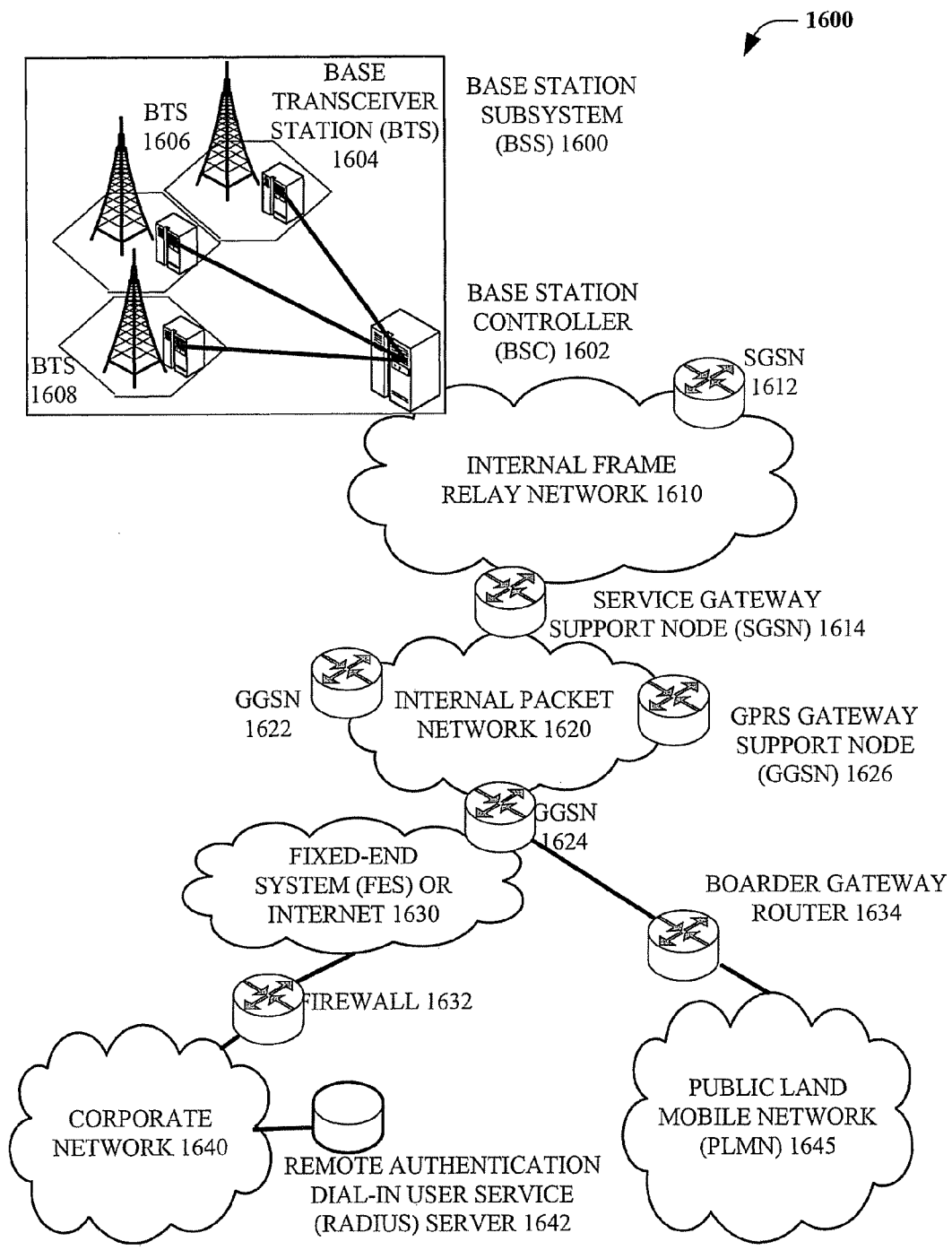
FIG. 16 illustrates an overview of a network environment suitable for service by embodiments of the disclosed subject matter.

FIG. 16 depicts an overall block diagram of an exemplary packet-based mobile cellular network environment, such as a GPRS network, in which the disclosed subject matter may be practiced. In such an environment, there are one or more Base Station Subsystems ("BSS") 1600 (only one is shown), each of which comprises a Base Station Controller ("BSC") 1602 serving a plurality of Base Transceiver Stations ("BTS") such as BTSs 1604, 1606, and 1608. BTSs 1604, 1606, 1608, etc. are the access points where users of packet-based mobile devices become connected to the wireless network. In exemplary fashion, the packet traffic originating from user devices is transported over the air interface to a BTS 1608, and from the BTS 1608 to the BSC 1602. Base station subsystems, such as BSS 1600, are a part of internal frame relay network 1610 that may include Service GPRS Support Nodes ("SGSN") such as SGSN 1612 and 1614. Each SGSN is in turn connected to an internal packet network 1620 through which a SGSN 1612, 1614, etc. can route data packets to and from a plurality of gateway GPRS support nodes (GGSN) 1622, 1624, 1626, etc. As illustrated, SGSN 1614 and GGSNs 1622, 1624, and 1626 are part of internal packet network 1620. Gateway GPRS serving nodes 1622, 1624 and 1626 mainly provide an interface to external Internet Protocol ("IP") networks such as Public Land Mobile Network ("PLMN") 1645, corporate intranets 1640, or Fixed-End System ("FES") or the public Internet 1630. As illustrated, subscriber corporate network 1640 may be connected to GGSN 1624 via firewall 1632; and PLMN 1645 is connected to GGSN 1624 via boarder gateway router 1634. The Remote Authentication Dial-In User Service ("RADIUS") server 1642 may be used for caller authentication when a user of a mobile cellular device calls corporate network 1640.

Generally, there can be four different cell sizes in a GSM network—macro, micro, pico and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Various implementations of the disclosed subject matter described herein may have aspects that are wholly in hardware, partly in hardware and partly in software, as well as in software. Furthermore, aspects may be fully integrated into a single component, be assembled from discrete devices, or implemented as a combination suitable to the particular application and is a matter of design choice. As used herein, the terms "device," "component," "system," and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the systems of the disclosed subject matter, or certain aspects or portions thereof, may take the form of program code (e.g., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed subject matter. In the case of program code execution on programmable computers, the computing device generally includes a processor, a storage medium readable by the processor (including volatile and non-volatile memory and/or storage elements), at least one input device, and at least one output device. In addition, the components may communicate via local and/or remote processes such as in accordance with a signal having one or more data packets (e.g., data from one component interacting with another component in a local system, distributed system, and/or across a network such as the Internet with other systems via the signal).

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the some aspects of the disclosed subject matter may be implemented as a system, method, apparatus, or article of manufacture using standard programming and/or engineering techniques to produce software, firmware, hardware, or any combination thereof to control a computer or processor based device to implement aspects detailed herein. The terms "article of manufacture", "computer program product" or similar terms, where used herein, are intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally, it is known that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the various embodiments.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components, e.g., according to a hierarchical arrangement. Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

While for purposes of simplicity of explanation, methodologies disclosed herein are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the disclosed subject matter has been described in connection with the particular embodiments of the various figures, it is to be understood that other similar embodiments may be used or modifications and additions may be made to the described embodiment for performing the same function of the disclosed subject matter without deviating therefrom. Still further, the disclosed subject matter may be implemented in or across a plurality of processing chips or devices, and storage may similarly be effected across a plurality of devices. Therefore, the disclosed subject matter should not be limited to any single embodiment, but rather should be construed in breadth and scope in accordance with the appended claims.

What is claimed is:

1. A transactional account method, comprising:
registering, by a computing device comprising a processor, a transactional account for a user, wherein the registering includes associating a plurality of items of user identifying information with the transactional account, wherein each item of the plurality of items of user identifying information enables a transferor of funds to specify the user in requesting a fund transfer to the user;
receiving, via the computing device, a notification from the transferor of funds specifying at least a subset of the plurality of items of user identifying information and requesting the fund transfer, wherein the notification comprises a message conforming to a money transfer messaging protocol; and
completing, via the computing device, the fund transfer for the user based on the subset of the plurality of items of user identifying information associated with the transactional account.

2. The method of claim 1, wherein the associating the plurality of items of user identifying information with the transactional account includes associating a plurality of items of user identifying information including at least a mobile device identification (ID), a mobile phone number, a mobile account number, an instant message ID, an email address, an online messaging account ID, an online voice account ID, a money transfer service account ID, or a transactional account number.

3. The method of claim 1, wherein the registering the transactional account for the user includes presenting instructions to the user regarding creating the transactional account based on a prior fund transfer request associated with the user.

4. The method of claim 1, wherein the registering the transactional account includes designating a deposit account associated with the user where the fund transfer is to be deposited.

5. The method of claim 1, wherein the completing the fund transfer includes receiving confirmation from the user based on the subset of the plurality of items of user identifying information associated with the transactional account.

6. The method of claim 1, wherein the receiving the notification from the transferor of funds includes obscuring or removing information regarding a source of the fund transfer.

7. The method of claim 1, wherein the receiving the message includes receiving the message including the subset of the plurality of items of user identifying information, a subset of a plurality of items of transferor identifying information, and an amount of the fund transfer.

8. The method of claim 1, wherein the completing the fund transfer includes completing the fund transfer without receiving confirmation from the user where the fund transfer is less than a predetermined value.

9. The method of claim 8, wherein the registering the transactional account includes specifying transactional account limitations including at least one of the predetermined value, whether to obscure a destination of the fund transfer, or a verification level for the fund transfer.

10. A method of accepting a fund transfer, the method comprising:
receiving on a computing device comprising a processor and associated with a user a notification from a transferor of funds specifying a subset of a plurality of items of user identifying information, wherein each item of the plurality of items of user identifying information enables the transferor of funds to specify the user in requesting a fund transfer to the user, and specifying a fund transfer request has been made in favor of the user;
responding to the notification, via the computing device, by accessing a confirmation resource referenced in the notification; and
confirming the fund transfer request at the confirmation resource from the computing device.

11. The method of claim 10, wherein the specifying the subset of the plurality of items of user identifying information includes specifying at least one of a mobile device identification (ID), a mobile phone number, a mobile account number, an instant message ID, an email address, an online messaging account ID, an online voice account ID, a money transfer service account ID, or a transactional account number.

12. The method of claim 10, wherein the receiving the notification includes receiving a password generated to allow collection of the fund transfer.

13. The method of claim 10, wherein the receiving the notification includes obscuring or removing information regarding a source of the fund transfer from the user.

14. The method of claim 10, wherein the confirming the fund transfer request includes confirming the fund transfer request based on the subset of the plurality of items of user identifying information.

15. The method of claim 10, wherein the confirming the fund transfer request includes obscuring or removing information regarding a destination of the fund transfer from the transferor of funds.

16. The method of claim 10, further comprising:
for an amount of the fund transfer below a predetermined value,
abstaining from at least one of responding to the notification, accessing the confirmation resource, or confirming the fund transfer request, via the computing device; and
receiving the fund transfer, via the computing device, according to a predetermined agreement.

17. The method of claim 10, wherein the accessing a confirmation resource referenced in the notification includes at least one of accessing a secure online resource configured to allow confirmation of the fund transfer, accessing instructions about how to register for a transactional account capable of accepting the fund transfer, or accessing instructions about how to collect the fund transfer in lieu of creating the transactional account.

18. The method of claim 17, further comprising:
registering for the transactional account including designating a deposit account associated with the user where the fund transfer is to be deposited.

19. The method of claim 10, wherein the responding to the notification includes sending a message conforming to a money transfer messaging protocol to the confirmation resource.

20. The method of claim 19, wherein the receiving the message includes receiving the message including the subset of the plurality of items of user identifying information, a subset of a plurality of items of transferor identifying information, and an amount of the fund transfer.

21. The method of claim 20, wherein the receiving the notification includes receiving the notification that conforms to the money transfer messaging protocol.

22. A computer readable storage medium comprising computer executable instructions that, in response to execution, cause a computing device comprising a processor to perform operations, comprising:
receiving, by the computing device associated with a user, a notification from a transferor of funds specifying a subset of a plurality of items of user identifying information, wherein each item of the plurality of items of user identifying information enables the transferor of funds to specify the user in requesting a fund transfer to the user, and specifying a fund transfer request has been made in favor of the user; and accepting user input to facilitate at least one of
responding to the notification by accessing a confirmation resource referenced by the notification, or
confirming the fund transfer request at the confirmation resource from the computing device.

23. The computer readable storage medium of claim 22, wherein the operations further comprise:
receiving the notification that conforms to a money transfer messaging protocol by including the subset of the plurality of items of user identifying information, a subset of a plurality of items of transferor identifying information, and an amount of the fund transfer.

24. The computer readable storage medium of claim 23, wherein the operations further comprise:
responding to the notification by sending a message conforming to the money transfer messaging protocol.

25. A transactional account system, comprising:
a memory to store computer-executable components; and
a processor communicatively coupled to the memory that facilitates execution of the computer-executable components, the computer-executable components comprising:
an account registration component configured to receive registration information including a plurality of items of user identifying information and to associate the plurality of items of user identifying information with a transactional account, wherein each item of the plurality of items of user identifying information enables a transferor of funds to specify the user or the transactional account in requesting a fund transfer to the user;
a confirmation component configured to present a confirmation resource to the user on demand by the user;
a verification component configured to receive a notification from the transferor of funds via a message conforming to a money transfer protocol, wherein the notification specifies a subset of the plurality of items of user identifying information and requests the fund transfer to the user, configured to receive a response from the user based on the confirmation resource, and configured to verify the response is received from the user specified by the subset of the plurality of items of user identifying information; and
a fund transfer component configured to complete the fund transfer based on the verification component verifying the response.

26. The system of claim 25, wherein the account registration component is further configured to present instructions to the user regarding creating the transactional account based on a prior fund transfer request associated with the user.

27. The system of claim 25, wherein the account registration component is further configured to allow designation of a deposit account associated with the user where the fund transfer is to be deposited.

28. The system of claim 25, wherein the plurality of items of user identifying information includes a plurality of items of user identifying information including at least a mobile device identification (ID), a mobile phone number, a mobile account number, an instant message ID, an email address, an online messaging account ID, an online voice account ID, a money transfer service account ID, or a transactional account number.

29. The system of claim 25, wherein the account registration component is further configured to allow specification of transactional account limitations including at least one of a predetermined value, below which user confirmation or verification is not desired by at least one of the user or the transferor of funds, whether to obscure a destination of the fund transfer, or a verification level for the fund transfer.

30. The system of claim 29, wherein the verification component is further configured to confirm the fund transfer request in the absence of receiving the response depending on the verification level.

31. The system of claim 29, wherein at least one of the confirmation component is further configured to present the confirmation resource or the confirmation component is further configured to receive the demand by the user.

32. The system of claim 29, wherein the message comprises the subset of the plurality of items of user identifying information, a subset of a plurality of items of transferor identifying information, and an amount of the fund transfer.

33. A computing device, comprising:
means for receiving, by the computing device associated with a user, a notification from a transferor of funds specifying a subset of a plurality of items of user identifying information and requesting a fund transfer to the user, wherein each item of the plurality of items of user identifying information enables the transferor of funds to specify the user in requesting a fund transfer to the user, and specifying a fund transfer request has been made in favor of the user;
means for responding to the notification by accessing a confirmation resource referenced in the notification; and
means for confirming the fund transfer request at the confirmation resource from the computing device.

34. The computing device of claim 33, wherein at least one of the means for receiving is further configured, the means for responding is further configured, or the means for confirming is further configured to receive a message conforming to a money transfer protocol, wherein the message comprises the subset of the plurality of items of user identifying information, a subset of a plurality of items of transferor identifying information, and an amount of the fund transfer.

35. A mobile device, comprising
a memory that stores computer-executable components, including:
a notification component configured to receive a notification from a transferor of funds specifying a subset of a plurality of items of user identifying information, wherein each item of the plurality of items of user identifying information enables the transferor of funds to specify a user of the mobile device in requesting a fund transfer to the user, and specifying a fund transfer request has been made in favor of the user;
an input component configured to facilitate responding to the notification by accessing a confirmation resource referenced by the notification and to facilitate confirming the fund transfer request at the confirmation resource from the computing device; and
a processor that executes or facilitates execution of at least one of the notification component or the input component.

36. The computing device of claim 35, wherein the notification component is further configured to receive the notification via a message conforming to a money transfer protocol, wherein the message comprises the subset of the plurality of items of user identifying information, a subset of a plurality of items of transferor identifying information, and an amount of the fund transfer.

* * * * *